United States Patent
Cohen et al.

(10) Patent No.: US 10,501,569 B2
(45) Date of Patent: Dec. 10, 2019

(54) HIGH-WEIGHT GLYCERIDE OLIGOMERS AND METHODS OF MAKING THE SAME

(71) Applicant: Elevance Renewable Sciences, Inc., Woodridge, IL (US)

(72) Inventors: Steven A. Cohen, Naperville, IL (US); Thomas E. Snead, Bolingbrook, IL (US)

(73) Assignee: Elevance Renewable Sciences, Inc., Woodridge, IL (US)

( * ) Notice: Subject to any disclaimer, the term of this patent is extended or adjusted under 35 U.S.C. 154(b) by 0 days.

(21) Appl. No.: 16/194,627

(22) Filed: Nov. 19, 2018

(65) Prior Publication Data

US 2019/0194374 A1 Jun. 27, 2019

Related U.S. Application Data

(63) Continuation of application No. 15/239,830, filed on Aug. 18, 2016, now Pat. No. 10,155,833.

(51) Int. Cl.
| | | |
|---|---|---|
| *C08F 222/10* | (2006.01) | |
| *C08F 222/00* | (2006.01) | |
| *B01J 31/00* | (2006.01) | |
| *C08G 63/52* | (2006.01) | |
| *C08G 61/08* | (2006.01) | |

(52) U.S. Cl.
CPC ......... *C08F 222/1006* (2013.01); *B01J 31/00* (2013.01); *C08F 222/00* (2013.01); *C08G 61/08* (2013.01); *C08G 63/52* (2013.01); *B01J 2231/543* (2013.01); *B01J 2531/64* (2013.01); *B01J 2531/66* (2013.01); *B01J 2531/821* (2013.01); *B01J 2531/825* (2013.01); *C08G 2261/334* (2013.01); *C08G 2261/418* (2013.01); *C08G 2261/419* (2013.01); *C08G 2261/724* (2013.01)

(58) Field of Classification Search
CPC ... C08F 222/1006; C08F 222/00; B01J 31/00; B01J 2231/543; B01J 2531/821; B01J 2531/64; B01J 2531/66; B01J 2531/826; C08G 63/52; C08G 61/08; C08G 2261/419; C08G 2261/334; C08G 2261/418; C08G 2261/724
USPC ....................................................... 526/325
See application file for complete search history.

(56) References Cited

U.S. PATENT DOCUMENTS

| | | | |
|---|---|---|---|
| 8,501,973 B2 | 8/2013 | Schrodi et al. | |
| 8,569,560 B2 | 10/2013 | Schrodi et al. | |
| 8,815,257 B2 | 8/2014 | Braksmayer et al. | |
| 8,957,268 B2 * | 2/2015 | Cohen | C10G 45/00 585/310 |
| 9,388,097 B2 * | 7/2016 | Wampler | C10G 3/46 |
| 9,668,955 B2 | 6/2017 | Braksmayer et al. | |
| 9,890,348 B2 | 2/2018 | Cohen et al. | |
| 10,039,699 B2 | 8/2018 | Braksmayer et al. | |
| 2013/0204022 A1 * | 8/2013 | Snead | C11C 3/14 554/125 |
| 2013/0281551 A1 | 10/2013 | Stella et al. | |
| 2013/0344012 A1 * | 12/2013 | Cohen | C11C 3/00 424/59 |
| 2015/0210855 A1 * | 7/2015 | Firth | C08L 91/06 106/268 |
| 2015/0321992 A1 | 11/2015 | Narine et al. | |
| 2018/0051114 A1 | 2/2018 | Cohen et al. | |
| 2018/0208873 A1 | 7/2018 | Cohen et al. | |

FOREIGN PATENT DOCUMENTS

| | | |
|---|---|---|
| WO | 2008046106 | 4/2008 |
| WO | 2015153742 | 10/2015 |
| WO | 2015168789 | 11/2015 |
| WO | 2018035283 | 2/2018 |

OTHER PUBLICATIONS

Akintayo et al., "Acyclic Triene Metathesis Polymerization of Plukenetia Conophora Oil: Branched Polymers by Direct Polymerization of Renewable Resources", Macromolecular Chemistry and Physics, vol. 213, No. 1, Jan. 16, 2012, pp. 87-96.

Pillai et al., "Triacylglycerol Self-metathesis Over Highly Chemoselective Methyltrioxorhenium Supported on Zncl 2-promoted Mesoporous Alumina", Applied Catalysis A: General, vol. 479, Apr. 14, 2014, pp. 121-133.

Refvik et al., "Ruthenium-catalyzed Metathesis of Vegetable Oils", Journal of the American Oil Chemists, Society, vol. 76, No. 1, 1999, pp. 93-98.

PCT/US2017/047271 , "International Search Report and Written Opinion", dated Dec. 27, 2017, 14 pages.

* cited by examiner

*Primary Examiner* — Michael Bernshteyn

(74) *Attorney, Agent, or Firm* — Kilpatrick Townsend & Stockton LLP

(57) ABSTRACT

Oligomers of certain glyceride compounds are generally disclosed herein. In some embodiments, the glyceride compounds include natural oil glycerides, such as glycerides derived from natural oils, such as palm oil, soybean oil, canola oil, and the like. Compositions containing such glyceride oligomers are also disclosed herein. Processes for making such glyceride oligomers are also disclosed herein. In some embodiments, the processes for making such compounds include reacting a plurality of unsaturated glyceride compounds in the presence of a metathesis catalyst.

14 Claims, 1 Drawing Sheet

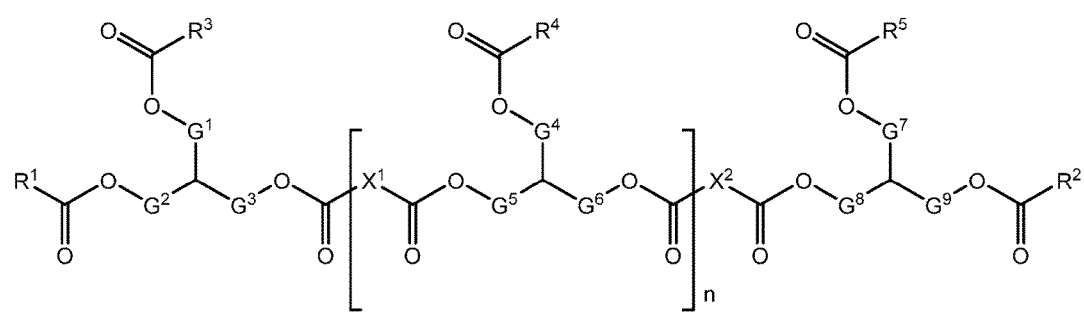

HIGH-WEIGHT GLYCERIDE OLIGOMERS AND METHODS OF MAKING THE SAME

CROSS-REFERENCE TO RELATED APPLICATIONS

The present application is a continuation of U.S. patent application Ser. No. 15/239,830, filed Aug. 18, 2016, which is hereby incorporated by reference as though set forth herein in its entirety.

TECHNICAL FIELD

Oligomers of certain glyceride compounds are disclosed herein. In some embodiments, the glyceride compounds include natural oil glycerides, such as glycerides of palm oil, soybean oil, canola oil, and the like. Compositions containing such glyceride oligomers are also disclosed herein. Processes for making such glyceride oligomers are also disclosed herein. In some embodiments, the processes for making such compounds include reacting unsaturated glyceride compounds in the presence of an olefin metathesis catalyst.

BACKGROUND

Branched-chain polyesters have a wide variety of applications. Their high molecular weight and low crystallinity makes them attractive for use in adhesive compositions, personal and consumer care compositions, as plasticizers and rheology modifiers, and the like. Such compounds are typically derived from certain short-chain dicarboxylic acids, such as adipic acid. Thus, such compounds may be unsuitable for certain applications, especially where it may be desirable that the polyester contain longer-chain hydrophobic portions.

The self-metathesis of natural oils, such as soybean oil, provides one means of making branched-chain polyesters having longer-chain hydrophobic portions. Certain such methods are disclosed in U.S. Patent Application Publication No. 2013/0344012. But, using such methods, it is still difficult to obtain branched-chain polyester compositions having a higher molecular weight, such as molecular weights corresponding to oligomers containing, on average, about 5-6 triglycerides or more. Obtaining higher molecular-weight oligomers using such methods presents a number of difficulties, including practical limits on the time and the quality of the vacuum needed to remove the product olefins to drive the reaction toward making higher-molecular-weight oligomers.

Thus, while using self-metathesis of natural oils provides a useful means of obtaining branched-chain polyesters, there remains a continuing need to develop processes that would allow for the practical synthesis of higher-weight glyceride oligomers.

SUMMARY

The present disclosure overcomes one or more of the above hurdles by providing higher molecular-weight glyceride oligomers and processes for making such compounds and compositions.

In a first aspect, the disclosure provides glyceride copolymers of formula (I):

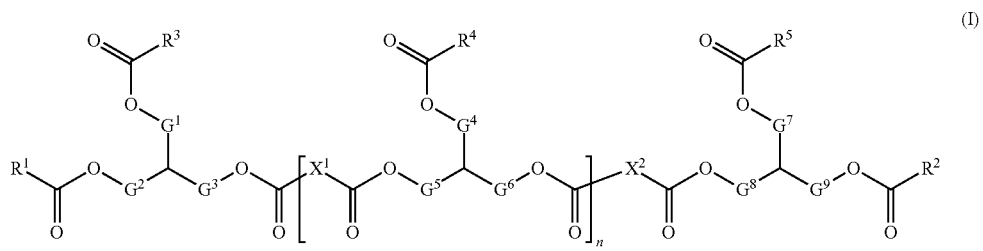

wherein: $R^1$, $R^2$, $R^3$, $R^4$, and $R^5$ are independently $C_{1-24}$ alkyl or $C_{2-24}$ alkenyl, each of which is optionally substituted one or more times by —OH, or are independently an oligomeric glyceride moiety; $X^1$ and $X^2$ are independently $C_{1-32}$ alkylene or $C_{2-32}$ alkenylene, each of which is optionally substituted one or more times by —OH; two of $G^1$, $G^2$, and $G^3$ are —CH$_2$—, and one of $G^1$, $G^2$, and $G^3$ is a direct bond; two of $G^4$, $G^5$, and $G^6$ are —CH$_2$—, and one of $G^4$, $G^5$, and $G^6$ is a direct bond; two of $G^7$, $G^8$, and $G^9$ are —CH$_2$—, and one of $G^7$, $G^8$, and $G^9$ is a direct bond; and n is an integer from 5 to 200; wherein the value $X^1$, $R^4$, $G^4$, $G^5$, and $G^6$ for each repeating unit is selected independently of its value in other repeating units; and wherein if $R^1$ and $R^3$, or $R^2$ and $R^5$, or $R^3$ and an adjacent $R^4$, or $R^5$ and an adjacent $R^4$, or any two adjacent $R^4$, are both alkenyl groups, the two groups optionally combine via metathesis to form an alkenylene group.

In a second aspect, glyceride copolymers, which comprises constitutional units formed from reacting two or more monomers in the presence of a metathesis catalyst, the two or more monomers comprise monomer compounds of formula (IIa):

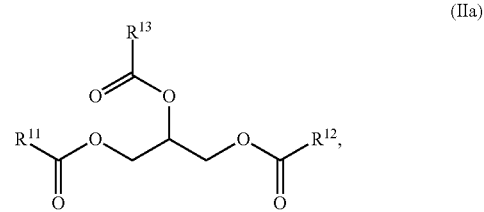

and monomer compounds of formula (IIb):

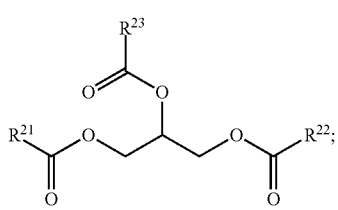

wherein, $R^{11}$, $R^{12}$, and $R^{13}$ are independently $C_{1-24}$ alkyl or $C_{2-24}$alkenyl, each of which is optionally substituted one or more times by —OH, provided that at least one of $R^{11}$, $R^{12}$, and $R^{13}$ is $C_{2-24}$alkenyl, which is optionally substituted one or more times by —OH; and $R^{21}$, $R^{22}$, and $R^{23}$ are independently $C_{1-24}$ alkyl or $C_{2-24}$alkenyl, each of which is optionally substituted one or more times by —OH.

In a third aspect, the disclosure provides glyceride copolymers, which comprises constitutional units formed from reacting two or more monomers in the presence of a first metathesis catalyst, the two or more monomers comprise a first monomer and a second monomer; wherein the first monomer is a first unsaturated natural oil glyceride or an unsaturated alkenylized natural oil glyceride, and the second monomer is an unsaturated alkenylized natural oil glyceride.

In a fourth aspect, the disclosure provides compositions comprising glyceride copolymers of the first, second, and/or third aspects or any embodiments thereof.

In a fifth aspect, the disclosure provides methods of forming a glyceride copolymer composition, the methods comprising: (a) providing a reaction mixture comprising a metathesis catalyst and monomer compounds of formula (IIIa):

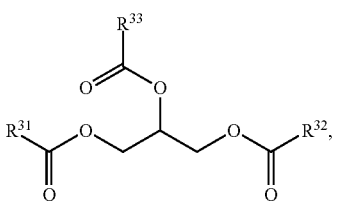

and monomer compounds of formula (IIIb):

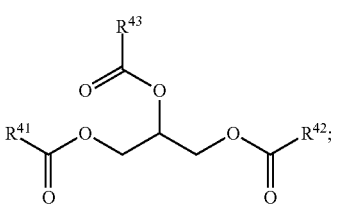

wherein, $R^{31}$, $R^{32}$, and $R^{33}$ are independently $C_{1-24}$ alkyl or $C_{2-24}$alkenyl, each of which is optionally substituted one or more times by —OH, provided that at least one of $R^{31}$, $R^{32}$, and $R^{33}$ is $C_{2-24}$alkenyl, which is optionally substituted one or more times by —OH; and $R^{41}$, $R^{42}$, and $R^{43}$ are independently $C_{1-24}$ alkyl or $C_{2-24}$alkenyl, each of which is optionally substituted one or more times by —OH, provided that at least one of $R^{41}$, $R^{42}$, and $R^{43}$ is 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl; and (b) reacting the monomer compounds of formula (IIIa) with the monomer compounds of formula (IIIb) in the presence of the metathesis catalyst to form the glyceride polymer composition.

In a sixth aspect, the disclosure provides methods of forming a glyceride copolymer, the methods comprising: (a) providing a reaction mixture comprising a first metathesis catalyst, unsaturated natural oil glycerides, and unsaturated alkenylized natural oil glycerides; and (b) reacting the unsaturated natural oil glycerides and unsaturated alkenylized natural oil glycerides in the presence of the first metathesis catalyst to form the glyceride copolymer.

Further aspects and embodiments are provided in the foregoing drawings, detailed description and claims.

BRIEF DESCRIPTION OF THE DRAWINGS

The following drawings are provided for purposes of illustrating various embodiments of the compositions and methods disclosed herein. The drawings are provided for illustrative purposes only, and are not intended to describe any preferred compositions or preferred methods, or to serve as a source of any limitations on the scope of the claimed inventions.

FIG. 1 shows a glyceride copolymer of certain aspects and embodiments disclosed herein, wherein: $R^1$, $R^2$, $R^3$, $R^4$, and $R^5$ are independently $C_{1-24}$ alkyl or $C_{2-24}$ alkenyl, each of which is optionally substituted, or are independently an oligomeric glyceride moiety; $X^1$ and $X^2$ are independently $C_{1-32}$ alkylene or $C_{2-32}$ alkenylene, each of which is optionally substituted; two of $G^1$, $G^2$, and $G^3$ are —$CH_2$—, and one of $G^1$, $G^2$, and $G^3$ is a direct bond; two of $G^4$, $G^5$, and $G^6$ are —$CH_2$—, and one of $G^4$, $G^5$, and $G^6$ is a direct bond; two of $G^7$, $G^8$, and $G^9$ are —$CH_2$—, and one of $G^7$, $G^8$, and $G^9$ is a direct bond; and n is an integer from 5 to 200; wherein the value $X^1$, $R^4$, $G^4$, $G^5$, and $G^6$ for each repeating unit is selected independently of its value in other repeating units; and wherein if $R^1$ and $R^3$, or $R^2$ and $R^5$, or $R^3$ and an adjacent $R^4$, or $R^5$ and an adjacent $R^4$, or any two adjacent $R^4$, are both alkenyl groups, the two groups optionally combine via metathesis to form an alkenylene group.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art.

In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure, and are not meant to be limiting in any fashion. Nor do these phrases indicate any kind of preference for the disclosed embodiment.

As used herein, "polymer" refers to a substance having a chemical structure that includes the multiple repetition of constitutional units formed from substances of comparatively low relative molecular mass relative to the molecular mass of the polymer. The term "polymer" includes soluble and/or fusible molecules having chains of repeat units, and also includes insoluble and infusible networks. As used herein, the term "polymer" can include oligomeric materials, which have only a few (e.g., 3-100) constitutional units As used herein, "natural oil" refers to oils obtained from plants or animal sources. The terms also include modified plant or animal sources (e.g., genetically modified plant or animal sources), unless indicated otherwise. Examples of natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil.

The term "natural oil glyceride" refers to a glyceryl ester of a fatty acid obtained from a natural oil. Such glycerides include monoacylglycerides, diacylglycerides, and triacylglyceriedes (triglycerides). In some embodiments, the natural oil glycerides are triglycerides. Analogously, the term "unsaturated natural oil glyceride" refers to natural oil glycerides, wherein at least one of its fatty acid residues contains unsaturation. For example, a glyceride of oleic acid is an unsaturated natural oil glyceride. The term "unsaturated alkenylized natural oil glyceride" refers to an unsaturated natural oil glyceride (as defined above) that is derivatized via a metathesis reaction with a short-chain olefin (as defined below). In some cases, olefinizing process shortens one or more of the fatty acid chains in the compound. For example, a glyceride of 9-decenoic acid is an unsaturated alkenylized natural oil glyceride. Similarly, butenylized (e.g., with 1-butene and/or 2-butene) canola oil is a natural oil glyceride that has been modified via metathesis to contain some short-chain unsaturated $C_{10}$-$C_{15}$ ester groups.

The term "oligomeric glyceride moiety" is a moiety comprising two or more (and up to 10, or up to 20) constitutional units formed via olefin metathesis from natural oil glycerides and/or alkenylized natural oil glycerides.

As used herein, "metathesis" refers to olefin metathesis. As used herein, "metathesis catalyst" includes any catalyst or catalyst system that catalyzes an olefin metathesis reaction.

As used herein, "metathesize" or "metathesizing" refer to the reacting of a feedstock in the presence of a metathesis catalyst to form a "metathesized product" comprising new olefinic compounds, i.e., "metathesized" compounds. Metathesizing is not limited to any particular type of olefin metathesis, and may refer to cross-metathesis (i.e., co-metathesis), self-metathesis, ring-opening metathesis, ring-opening metathesis polymerizations ("ROMP"), ring-closing metathesis ("RCM"), and acyclic diene metathesis ("ADMET"). In some embodiments, metathesizing refers to reacting two triglycerides present in a natural feedstock (self-metathesis) in the presence of a metathesis catalyst, wherein each triglyceride has an unsaturated carbon-carbon double bond, thereby forming a new mixture of olefins and esters which may include a triglyceride dimer. Such triglyceride dimers may have more than one olefinic bond, thus higher oligomers also may form. Additionally, in some other embodiments, metathesizing may refer to reacting an olefin, such as ethylene, and a triglyceride in a natural feedstock having at least one unsaturated carbon-carbon double bond, thereby forming new olefinic molecules as well as new ester molecules (cross-metathesis).

As used herein, "olefin" or "olefins" refer to compounds having at least one unsaturated carbon-carbon double bond. In certain embodiments, the term "olefins" refers to a group of unsaturated carbon-carbon double bond compounds with different carbon lengths. Unless noted otherwise, the terms "olefin" or "olefins" encompasses "polyunsaturated olefins" or "poly-olefins," which have more than one carbon-carbon double bond. As used herein, the term "monounsaturated olefins" or "mono-olefins" refers to compounds having only one carbon-carbon double bond. A compound having a terminal carbon-carbon double bond can be referred to as a "terminal olefin" or an "alpha-olefin," while an olefin having a non-terminal carbon-carbon double bond can be referred to as an "internal olefin." In some embodiments, the alpha-olefin is a terminal alkene, which is an alkene (as defined below) having a terminal carbon-carbon double bond. Additional carbon-carbon double bonds can be present.

The number of carbon atoms in any group or compound can be represented by the terms: "$C_z$", which refers to a group of compound having z carbon atoms; and "$C_{x-y}$", which refers to a group or compound containing from x to y, inclusive, carbon atoms. For example, "$C_{1-6}$alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. As a further example, a "$C_{4-10}$alkene" refers to an alkene molecule having from 4 to 10 carbon atoms, and, for example, includes, but is not limited to, 1-butene, 2-butene, isobutene, 1-pentene, 1-hexene, 3-hexene, 1-heptene, 3-heptene, 1-octene, 4-octene, 1-nonene, 4-nonene, and 1-decene.

As used herein, the terms "short-chain alkene" or "short-chain olefin" refer to any one or combination of unsaturated straight, branched, or cyclic hydrocarbons in the $C_{2-14}$ range, or the $C_{2-12}$ range, or the $C_{2-10}$ range, or the $C_{2-8}$ range. Such olefins include alpha-olefins, wherein the unsaturated carbon-carbon bond is present at one end of the compound. Such olefins also include diener or trienes. Such olefins also include internal olefins. Examples of short-chain alkenes in the $C_{2-6}$ range include, but are not limited to: ethylene, propylene, 1-butene, 2-butene, isobutene, 1-pentene, 2-pentene, 2-methyl-1-butene, 2-methyl-2-butene, 3-methyl-1-butene, cyclopentene, 1,4-pentadiene, 1-hexene, 2-hexene, 3-hexene, 2-methyl-1-pentene, 3-methyl-1-pentene, 4-methyl-1-pentene, 2-methyl-2-pentene, 3-methyl-2-pentene, 4-methyl-2-pentene, 2-methyl-3-pentene, and cyclohexene. Non-limiting examples of short-chain alkenes in the $C_{7-9}$ range include 1,4-heptadiene, 1-heptene, 3,6-nonadiene, 3-nonene, 1,4,7-octatriene. In certain embodiments, it is preferable to use a mixture of olefins, the mixture comprising linear and branched low-molecular-weight olefins in the $C_{4-10}$ range. In one embodiments, it may be preferable to use a mixture of linear and branched $C_4$ olefins (i.e., combinations of: 1-butene, 2-butene, and/or isobutene). In other embodiments, a higher range of $C_{11-14}$ may be used.

As used herein, "alkyl" refers to a straight or branched chain saturated hydrocarbon having 1 to 30 carbon atoms, which may be optionally substituted, as herein further described, with multiple degrees of substitution being allowed. Examples of "alkyl," as used herein, include, but are not limited to, methyl, ethyl, n-propyl, isopropyl, isobutyl, n-butyl, sec-butyl, tert-butyl, isopentyl, n-pentyl, neopentyl, n-hexyl, and 2-ethylhexyl. The number of carbon atoms in an alkyl group is represented by the phrase "$C_{x-y}$alkyl," which refers to an alkyl group, as herein defined, containing from x to y, inclusive, carbon atoms. Thus, "$C_{1-6}$alkyl" represents an alkyl chain having from 1 to 6 carbon atoms and, for example, includes, but is not limited to, methyl, ethyl, n-propyl, isopropyl, isobutyl, n-butyl, sec-butyl, tert-butyl, isopentyl, n-pentyl, neopentyl, and n-hexyl. In some instances, the "alkyl" group can be divalent, in which case the group can alternatively be referred to as an "alkylene" group.

As used herein, "alkenyl" refers to a straight or branched chain non-aromatic hydrocarbon having 2 to 30 carbon atoms and having one or more carbon-carbon double bonds, which may be optionally substituted, as herein further described, with multiple degrees of substitution being allowed. Examples of "alkenyl," as used herein, include, but are not limited to, ethenyl, 2-propenyl, 2-butenyl, and 3-butenyl. The number of carbon atoms in an alkenyl group is represented by the phrase "$C_{x-y}$alkenyl," which refers to an alkenyl group, as herein defined, containing from x to y, inclusive, carbon atoms. Thus, "$C_{2-6}$ alkenyl" represents an alkenyl chain having from 2 to 6 carbon atoms and, for example, includes, but is not limited to, ethenyl, 2-propenyl, 2-butenyl, and 3-butenyl. In some instances, the "alkenyl" group can be divalent, in which case the group can alternatively be referred to as an "alkenylene" group.

As used herein, "direct bond" refers to an embodiment where the identified moiety is absent from the structure, and is replaced by a bond between other moieties to which it is connected. For example, if the specification or claims recite A-D-E and D is defined as a direct bond, the resulting structure is A-E.

As used herein, "substituted" refers to substitution of one or more hydrogen atoms of the designated moiety with the named substituent or substituents, multiple degrees of substitution being allowed unless otherwise stated, provided that the substitution results in a stable or chemically feasible compound. A stable compound or chemically feasible compound is one in which the chemical structure is not substantially altered when kept at a temperature from about −80° C. to about +40° C., in the absence of moisture or other chemically reactive conditions, for at least a week. As used herein, the phrases "substituted with one or more . . . " or "substituted one or more times . . . " refer to a number of substituents that equals from one to the maximum number of substituents possible based on the number of available bonding sites, provided that the above conditions of stability and chemical feasibility are met.

As used herein, "mix" or "mixed" or "mixture" refers broadly to any combining of two or more compositions. The two or more compositions need not have the same physical state; thus, solids can be "mixed" with liquids, e.g., to form a slurry, suspension, or solution. Further, these terms do not require any degree of homogeneity or uniformity of composition. This, such "mixtures" can be homogeneous or heterogeneous, or can be uniform or non-uniform. Further, the terms do not require the use of any particular equipment to carry out the mixing, such as an industrial mixer.

As used herein, "optionally" means that the subsequently described event(s) may or may not occur. In some embodiments, the optional event does not occur. In some other embodiments, the optional event does occur one or more times.

As used herein, "comprise" or "comprises" or "comprising" or "comprised of" refer to groups that are open, meaning that the group can include additional members in addition to those expressly recited. For example, the phrase, "comprises A" means that A must be present, but that other members can be present too. The terms "include," "have," and "composed of" and their grammatical variants have the same meaning. In contrast, "consist of" or "consists of" or "consisting of" refer to groups that are closed. For example, the phrase "consists of A" means that A and only A is present.

As used herein, "or" is to be given its broadest reasonable interpretation, and is not to be limited to an either/or construction. Thus, the phrase "comprising A or B" means that A can be present and not B, or that B is present and not A, or that A and B are both present. Further, if A, for example, defines a class that can have multiple members, e.g., $A_1$ and $A_2$, then one or more members of the class can be present concurrently.

In some instances herein, organic compounds are described using the "line structure" methodology, where chemical bonds are indicated by a line, where the carbon atoms are not expressly labeled, and where the hydrogen atoms covalently bound to carbon (or the C—H bonds) are not shown at all. For example, by that convention, the formula

represents n-propane. In some instances herein, a squiggly bond is used to show the compound can have any one of two or more isomers. For example, the structure

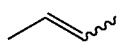

can refer to (E)-2-butene or (Z)-2-butene. The same is true when olefinic structures are drawn that are ambiguous as to which isomer is referred to. For example, $CH_3$—CH═CH—$CH_3$ can refer to (E)-2-butene or (Z)-2-butene.

As used herein, the various functional groups represented will be understood to have a point of attachment at the functional group having the hyphen or dash (—) or an asterisk (*). In other words, in the case of —CH$_2$CH$_2$CH$_3$, it will be understood that the point of attachment is the CH$_2$ group at the far left. If a group is recited without an asterisk or a dash, then the attachment point is indicated by the plain and ordinary meaning of the recited group.

As used herein, multi-atom bivalent species are to be read from left to right. For example, if the specification or claims recite A-D-E and D is defined as —OC(O)—, the resulting group with D replaced is: A-OC(O)-E and not A-C(O)O-E.

Other terms are defined in other portions of this description, even though not included in this subsection.

Glyceride Oligomers

In one aspect, the disclosure provides glyceride copolymers of formula (I):

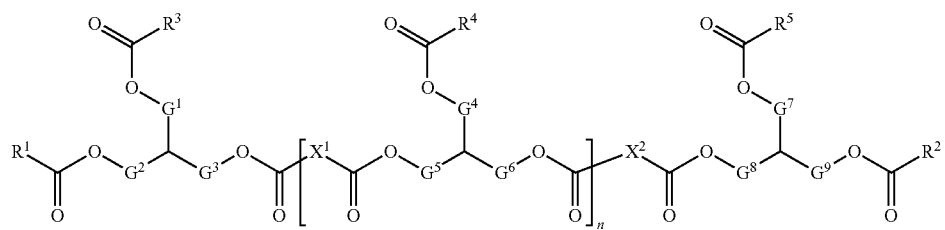

(I)

wherein: $R^1$, $R^2$, $R^3$, $R^4$, and $R^5$ are independently C$_{1-24}$ alkyl or C$_{2-24}$ alkenyl, each of which is optionally substituted one or more times by —OH, or are independently an oligomeric glyceride moiety; $X^1$ and $X^2$ are independently C$_{1-32}$ alkylene or C$_{2-32}$ alkenylene, each of which is optionally substituted one or more times by —OH; two of $G^1$, $G^2$, and $G^3$ are —CH$_2$—, and one of $G^1$, $G^2$, and $G^3$ is a direct bond; two of $G^4$, $G^5$, and $G^6$ are —CH$_2$—, and one of $G^4$, $G^5$, and $G^6$ is a direct bond; two of $G^2$, $G^8$, and $G^9$ are —CH$_2$—, and one of $G^2$, $G^8$, and $G^9$ is a direct bond; and n is an integer from 5 to 200; wherein the value $X^1$, $R^4$, $G^4$, $G^5$, and $G^6$ for each repeating unit is selected independently of its value in other repeating units; and wherein if $R^1$ and $R^3$, or $R^2$ and $R^5$, or $R^3$ and an adjacent $R^4$, or $R^5$ and an adjacent $R^4$, or any two adjacent $R^4$, are both alkenyl groups, the two groups optionally combine via metathesis to form an alkenylene group.

$G^1$, $G^2$, and $G^3$ can have any suitable value. In some embodiments, $G^1$ and $G^2$ are —CH$_2$— and $G^3$ is a direct bond. In some other embodiments, $G^1$ and $G^3$ are —CH$_2$— and $G^2$ is a direct bond. In some other embodiments, $G^2$ and $G^3$ are —CH$_2$— and $G^1$ is a direct bond.

$G^4$, $G^5$, and $G^6$ can, in each instance, independently have any suitable value. In some embodiments of any of the aforementioned embodiments, in at least one instance, $G^4$ and $G^5$ are —CH$_2$— and $G^6$ is a direct bond. In some other embodiments of any of the aforementioned embodiments, in at least one instance, $G^4$ and $G^6$ are —CH$_2$— and $G^5$ is a direct bond. In some other embodiments of any of the aforementioned embodiments, in at least one instance, $G^5$ and $G^6$ are —CH$_2$— and $G^4$ is a direct bond.

$G^2$, $G^8$, and $G^9$ can have any suitable value. In some embodiments of any of the aforementioned embodiments, $G^7$ and $G^8$ are —CH$_2$— and $G^9$ is a direct bond. In some other embodiments of any of the aforementioned embodiments, $G^7$ and $G^9$ are —CH$_2$— and $G^8$ is a direct bond. In some other embodiments of any of the aforementioned embodiments, $G^8$ and $G^9$ are —CH$_2$— and $G^7$ is a direct bond.

$X^1$ can have any suitable value. In some embodiments of any of the aforementioned embodiments, $X^1$ is —(CH$_2$)$_{16}$—, —(CH$_2$)$_{18}$—, —(CH$_2$)$_{19}$—, —(CH$_2$)$_{20}$—, —(CH$_2$)$_{22}$—, —(CH$_2$)$_{25}$—, —(CH$_2$)$_{28}$—, —(CH$_2$)$_7$—CH=CH—(CH$_2$)$_7$—, —(CH$_2$)$_9$—CH=CH—(CH$_2$)$_7$—, —(CH$_2$)$_7$—CH=CH—(CH$_2$)$_9$—, —(CH$_2$)$_{11}$—CH=CH—(CH$_2$)$_7$—, —(CH$_2$)$_7$—CH=CH—(CH$_2$)$_{11}$—, —(CH$_2$)$_7$—CH=CH—CH$_2$—CH=CH—(CH$_2$)$_7$—, —(CH$_2$)$_7$—CH=CH—CH$_2$—CH=CH—CH$_2$—CH=CH—(CH$_2$)$_7$—, —(CH$_2$)$_7$—CH=CH—CH$_2$—CH=CH—CH$_2$—CH=CH—CH$_2$—, or —(CH$_2$)$_7$—CH=CH—CH$_2$—CH=CH—CH$_2$—CH=CH—CH$_2$—CH=CH—(CH$_2$)$_7$—. In some such embodiments, $X^1$ is —(CH$_2$)$_{16}$—, —(CH$_2$)$_{18}$—, —(CH$_2$)$_{19}$—, —(CH$_2$)$_{22}$—, —(CH$_2$)$_{25}$—, —(CH$_2$)$_{28}$—, —(CH$_2$)$_7$—CH=CH—(CH$_2$)$_7$—, —(CH$_2$)$_9$—CH=CH—(CH$_2$)$_7$—, —(CH$_2$)$_7$—CH=CH—(CH$_2$)$_9$—, —(CH$_2$)$_7$—CH=CH—CH$_2$—CH=CH—(CH$_2$)$_7$—, —(CH$_2$)$_7$—CH=CH—CH$_2$—CH=CH—CH$_2$—CH=CH—(CH$_2$)$_7$—, —(CH$_2$)$_7$—CH=CH—CH$_2$—CH=CH—CH$_2$—CH=CH—CH$_2$—, or —(CH$_2$)$_7$—CH=CH—CH$_2$—CH=CH—CH$_2$—CH=CH—CH$_2$—CH=CH—(CH$_2$)$_7$—. In some such embodiments, $X^1$ is —(CH$_2$)$_{16}$—, —(CH$_2$)$_{19}$—, —(CH$_2$)$_{22}$—, —(CH$_2$)$_{25}$—, —(CH$_2$)$_{28}$—, —(CH$_2$)$_7$—CH=CH—(CH$_2$)$_7$—, —(CH$_2$)$_7$—CH=CH—CH$_2$—CH=CH—(CH$_2$)$_7$—, —(CH$_2$)$_7$—CH=CH—CH$_2$—CH=CH—CH$_2$—CH=CH—(CH$_2$)$_7$—, —(CH$_2$)$_7$—CH=CH—CH$_2$—CH=CH—CH$_2$—CH=CH—CH$_2$—, or —(CH$_2$)$_7$—CH=CH—CH$_2$—CH=CH—CH$_2$—CH=CH—CH$_2$—CH=CH—(CH$_2$)$_7$—. In some further such embodiments, $X^1$ is —(CH$_2$)$_7$—CH=CH—(CH$_2$)$_7$—, —(CH$_2$)$_9$—CH=CH—(CH$_2$)$_7$—, —(CH$_2$)$_7$—CH=CH—(CH$_2$)$_9$—, —(CH$_2$)$_7$—CH=CH—CH$_2$—CH=CH—(CH$_2$)$_7$—, —(CH$_2$)$_7$—CH=CH—CH$_2$—CH=CH—CH$_2$—, —(CH$_2$)$_7$—CH=CH—CH$_2$—CH=CH—CH$_2$—CH=CH—(CH$_2$)$_7$—, or —(CH$_2$)$_7$—CH=CH—CH$_2$—CH=CH—CH$_2$—CH=CH—CH$_2$—CH=CH—(CH$_2$)$_7$—. In some further such embodiments, $X^1$ is —(CH$_2$)$_7$—CH=CH—(CH$_2$)$_7$—, —(CH$_2$)$_7$—CH=CH—CH$_2$—CH=CH—(CH$_2$)$_7$—, —(CH$_2$)$_7$—CH=CH—CH$_2$—CH=CH—CH$_2$—CH=CH—(CH$_2$)$_7$—, or —(CH$_2$)$_7$—CH=CH—CH$_2$—CH=CH—CH$_2$—CH=CH—CH$_2$—CH=CH—(CH$_2$)$_7$—.

$X^2$ can have any suitable value. In some embodiments of any of the aforementioned embodiments, $X^2$ is —(CH$_2$)$_{16}$—, —(CH$_2$)$_{18}$—, —(CH$_2$)$_{19}$—, —(CH$_2$)$_{20}$—, —(CH$_2$)$_{22}$—, —(CH$_2$)$_{25}$—, —(CH$_2$)$_{28}$—, —(CH$_2$)$_7$—CH=CH—(CH$_2$)$_7$—, —(CH$_2$)$_9$—CH=CH—(CH$_2$)$_7$—, —(CH$_2$)$_2$—CH=CH—(CH$_2$)$_9$—, —(CH$_2$)$_{11}$—CH=CH—(CH$_2$)$_7$—, —(CH$_2$)$_7$—CH=CH—(CH$_2$)$_{11}$—, —(CH$_2$)$_7$—CH=CH—CH$_2$—CH=CH—(CH$_2$)$_7$—, —(CH$_2$)$_7$—CH=CH—CH$_2$—CH=CH—CH$_2$—CH=CH—(CH$_2$)$_7$—, —(CH$_2$)$_7$—CH=CH—CH$_2$—CH=CH—CH$_2$—CH=CH—CH$_2$—CH=CH—(CH$_2$)$_7$—, or —(CH$_2$)$_7$—CH=CH—CH$_2$—CH=CH—CH$_2$—CH=CH—CH$_2$—CH=CH—CH$_2$—CH=CH—(CH$_2$)$_7$—. In some such embodiments, X$^2$ is —(CH$_2$)$_{16}$—, —(CH$_2$)$_{18}$—, —(CH$_2$)$_{19}$—, —(CH$_2$)$_{22}$—, —(CH$_2$)$_{25}$—, —(CH$_2$)$_{28}$—, —(CH$_2$)$_7$—CH=CH—(CH$_2$)$_7$—, —(CH$_2$)$_9$—CH=CH—(CH$_2$)$_7$—, —(CH$_2$)$_7$—CH=CH—(CH$_2$)$_9$—, —(CH$_2$)$_7$—CH=CH—CH$_2$—CH=CH—(CH$_2$)$_7$—, —(CH$_2$)$_7$—CH=CH—CH$_2$—CH=CH—CH$_2$—CH=CH—(CH$_2$)$_7$—, —(CH$_2$)$_7$—CH=CH—CH$_2$—CH=CH—CH$_2$—CH=CH—CH$_2$—CH=CH—(CH$_2$)$_7$—, or —(CH$_2$)$_7$—CH=CH—CH$_2$—CH=CH—CH$_2$—CH=CH—CH$_2$—CH=CH—CH$_2$—CH=CH—(CH$_2$)$_7$—. In some such embodiments, X$^2$ is —(CH$_2$)$_{16}$—, —(CH$_2$)$_{19}$—, —(CH$_2$)$_{22}$—, —(CH$_2$)$_{25}$—, —(CH$_2$)$_{28}$—, —(CH$_2$)$_7$—CH=CH—(CH$_2$)$_7$—, —(CH$_2$)$_7$—CH=CH—CH$_2$—CH=CH—(CH$_2$)$_7$—, —(CH$_2$)$_2$—CH=CH—CH$_2$—CH=CH—(CH$_2$)$_7$—, —(CH$_2$)$_7$—CH=CH—CH$_2$—CH=CH—CH$_2$—CH=CH—(CH$_2$)$_7$—, —(CH$_2$)$_7$—CH=CH—CH$_2$—CH=CH—CH$_2$—CH=CH—CH$_2$—CH=CH—(CH$_2$)$_7$—, or —(CH$_2$)$_7$—CH=CH—CH$_2$—CH=CH—CH$_2$—CH=CH—CH$_2$—CH=CH—CH$_2$—CH=CH—(CH$_2$)$_7$—. In some further such embodiments, X$^2$ is —(CH$_2$)$_7$—CH=CH—(CH$_2$)$_7$—, —(CH$_2$)$_9$—CH=CH—(CH$_2$)$_7$—, —(CH$_2$)$_7$—CH=CH—(CH$_2$)$_9$—, —(CH$_2$)$_7$—CH=CH—CH$_2$—CH=CH—(CH$_2$)$_7$—, —(CH$_2$)$_7$—CH=CH—CH$_2$—CH=CH—CH$_2$—CH=CH—(CH$_2$)$_7$—, —(CH$_2$)$_7$—CH=CH—CH$_2$—CH=CH—CH$_2$—CH=CH—CH$_2$—CH=CH—(CH$_2$)$_7$—, or —(CH$_2$)$_7$—CH=CH—CH$_2$—CH=CH—CH$_2$—CH=CH—CH$_2$—CH=CH—CH$_2$—CH=CH—(CH$_2$)$_7$—. In some further such embodiments, X$^2$ is —(CH$_2$)$_7$—CH=CH—(CH$_2$)$_7$—, —(CH$_2$)$_7$—CH=CH—CH$_2$—CH=CH—(CH$_2$)$_7$—, —(CH$_2$)$_7$—CH=CH—CH$_2$—CH=CH—CH$_2$—CH=CH—(CH$_2$)$_7$—, or —(CH$_2$)$_7$—CH=CH—CH$_2$—CH=CH—CH$_2$—CH=CH—CH$_2$—CH=CH—CH$_2$—CH=CH—(CH$_2$)$_7$—.

R$^1$ can have any suitable value. In some embodiments of any of the aforementioned embodiments, R$^1$ is C$_{1-24}$ alkyl, or C$_{11-24}$ alkyl, or C$_{13-24}$ alkyl, or C$_{15-24}$ alkyl. In some such embodiments, R$^1$ is undecyl, tridecyl, pentadecyl, or heptadecyl. In some further such embodiments, R$^1$ is pentadecyl or heptadecyl. In some embodiments of any of the aforementioned embodiments, R$^1$ is C$_{2-24}$ alkenyl or C$_{9-24}$ alkenyl. In some such embodiments, R$^1$ is 8-heptadecenyl, 10-heptadecenyl, 12-heneicosenyl, 8,11-heptadecadienyl, 8,11,14-heptadecatrienyl, 8-nonenyl, 8-decenyl, 8-undecenyl, 10-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, R$^1$ is 8-heptadecenyl, 10-heptadecenyl, 8,11-heptadecadienyl, or 8,11,14-heptadecatrienyl. In some further such embodiments, R$^1$ is 8-heptadecenyl, 8,11-heptadecadienyl, or 8,11,14-heptadecatrienyl. In some such embodiments, R$^1$ is 8-nonenyl, 8-decenyl, 8-undecenyl, 10-undecenyl, 8-dodecenyl, 8,11-dodecadienyl, 8,11-tridecadienyl, 12-tridecenyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, R$^1$ is 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, R$^1$ is 8-nonenyl, 8-undecenyl, 8,11-dodecadienyl, 8,11-tetradecadienyl, or 8,11,14-pentadecatrienyl. In some embodiments, R$^1$ is an oligomeric glyceride moiety.

R$^2$ can have any suitable value. In some embodiments of any of the aforementioned embodiments, R$^2$ is C$_{1-24}$ alkyl, or C$_{11-24}$ alkyl, or C$_{13-24}$ alkyl, or C$_{15-24}$ alkyl. In some such embodiments, R$^2$ is undecyl, tridecyl, pentadecyl, or heptadecyl. In some further such embodiments, R$^2$ is pentadecyl or heptadecyl. In some embodiments of any of the aforementioned embodiments, R$^2$ is C$_{2-24}$ alkenyl or C$_{9-24}$ alkenyl. In some such embodiments, R$^2$ is 8-heptadecenyl, 10-heptadecenyl, 12-heneicosenyl, 8,11-heptadecadienyl, 8,11,14-heptadecatrienyl, 8-nonenyl, 8-decenyl, 8-undecenyl, 10-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, R$^2$ is 8-heptadecenyl, 10-heptadecenyl, 8,11-heptadecadienyl, or 8,11,14-heptadecatrienyl. In some further such embodiments, R$^2$ is 8-heptadecenyl, 8,11-heptadecadienyl, or 8,11,14-heptadecatrienyl. In some such embodiments, R$^2$ is 8-nonenyl, 8-decenyl, 8-undecenyl, 10-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, R$^2$ is 8-nonenyl, 8-decenyl, 8-undecenyl, 8-dodecenyl, 8,11-dodecadienyl, 8,11-tridecadienyl, 12-tridecenyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, R$^2$ is 8-nonenyl, 8-undecenyl, 8,11-dodecadienyl, 8,11-tetradecadienyl, or 8,11,14-pentadecatrienyl. In some embodiments, R$^2$ is an oligomeric glyceride moiety.

R$^3$ can have any suitable value. In some embodiments of any of the aforementioned embodiments, R$^3$ is C$_{1-24}$ alkyl, or C$_{11-24}$ alkyl, or C$_{13-24}$ alkyl, or C$_{15-24}$ alkyl. In some such embodiments, R$^3$ is undecyl, tridecyl, pentadecyl, or heptadecyl. In some further such embodiments, R$^3$ is pentadecyl or heptadecyl. In some embodiments of any of the aforementioned embodiments, R$^3$ is C$_{2-24}$ alkenyl or C$_{9-24}$ alkenyl. In some such embodiments, R$^3$ is 8-heptadecenyl, 10-heptadecenyl, 12-heneicosenyl, 8,11-heptadecadienyl, 8,11,14-heptadecatrienyl, 8-nonenyl, 8-decenyl, 8-undecenyl, 10-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, R$^3$ is 8-heptadecenyl, 10-heptadecenyl, 8,11-heptadecadienyl, or 8,11,14-heptadecatrienyl. In some further such embodiments, R$^3$ is 8-heptadecenyl, 8,11-heptadecadienyl, or 8,11,14-heptadecatrienyl. In some such embodiments, R$^3$ is 8-nonenyl, 8-decenyl, 8-undecenyl, 10-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, R$^3$ is 8-nonenyl, 8-decenyl, 8-undecenyl, 8-dodecenyl, 8,11-dodecadienyl, 8,11-tridecadienyl, 12-tridecenyl, 8,11-tetradecadienyl, 8,11- pentadecadienyl, 8,11,14-pentadecatrienyl, 8,11,14-hexadecatrienyl, 8,11,14-heptadecatrienyl, or 8,11,14-octadecatrienyl. In some further such embodiments, $R^3$ is 8-nonenyl, 8-undecenyl, 8,11-dodecadienyl, 8,11-tetradecadienyl, or 8,11,14-pentadecatrienyl. In some embodiments, $R^3$ is an oligomeric glyceride moiety.

$R^4$ can, in each of its instances, have any suitable value. In some embodiments of any of the aforementioned embodiments, $R^4$, in at least one instance, is $C_{1-24}$ alkyl, or $C_{11-24}$ alkyl, or $C_{13-24}$ alkyl, or $C_{15-24}$ alkyl. In some such embodiments, $R^4$ is, in at least one instance, undecyl, tridecyl, pentadecyl, or heptadecyl. In some further such embodiments, $R^4$ is, in at least one instance, pentadecyl or heptadecyl. In some embodiments of any of the aforementioned embodiments, $R^4$ is, in at least one instance, $C_{2-24}$ alkenyl or $C_{9-24}$ alkenyl. In some such embodiments, $R^4$ is, in at least one instance, 8-heptadecenyl, 10-heptadecenyl, 12-heneicosenyl, 8,11-heptadecadienyl, 8,11,14-heptadecatrienyl, 8-nonenyl, 8-decenyl, 8-undecenyl, 10-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^4$ is, in at least one instance, 8-heptadecenyl, 10-heptadecenyl, 8,11-heptadecadienyl, or 8,11,14-heptadecatrienyl. In some further such embodiments, $R^4$ is, in at least one instance, 8-heptadecenyl, 8,11-heptadecadienyl, or 8,11,14-heptadecatrienyl. In some such embodiments, $R^4$ is, in at least one instance, 8-nonenyl, 8-decenyl, 8-undecenyl, 10-undecenyl, 8-dodecenyl, 8,11-dodecadienyl, 8,11-tridecadienyl, 12-tridecenyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^4$ is, in at least one instance, 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^4$ is, in at least one instance, 8-nonenyl, 8-undecenyl, 8,11-dodecadienyl, 8,11-tetradecadienyl, or 8,11,14-pentadecatrienyl. In some embodiments, $R^4$, in at least one instance, is an oligomeric glyceride moiety.

$R^5$ can have any suitable value. In some embodiments of any of the aforementioned embodiments, $R^5$ is $C_{1-24}$ alkyl, or $C_{11-24}$ alkyl, or $C_{13-24}$ alkyl, or $C_{15-24}$ alkyl. In some such embodiments, $R^5$ is undecyl, tridecyl, pentadecyl, or heptadecyl. In some further such embodiments, $R^5$ is pentadecyl or heptadecyl. In some embodiments of any of the aforementioned embodiments, $R^5$ is $C_{2-24}$ alkenyl or $C_{9-24}$ alkenyl. In some such embodiments, $R^5$ is 8-heptadecenyl, 10-heptadecenyl, 12-heneicosenyl, 8,11-heptadecadienyl, 8,11,14-heptadecatrienyl, 8-nonenyl, 8-decenyl, 8-undecenyl, 10-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^5$ is 8-heptadecenyl, 10-heptadecenyl, 8,11-heptadecadienyl, or 8,11,14-heptadecatrienyl. In some further such embodiments, $R^5$ is 8-heptadecenyl, 8,11-heptadecadienyl, or 8,11,14-heptadecatrienyl. In some such embodiments, $R^5$ is 8-nonenyl, 8-decenyl, 8-undecenyl, 10-undecenyl, 8-dodecenyl, 8,11-dodecadienyl, 12-tridecenyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^5$ is 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, $R^5$ is 8-nonenyl, 8-undecenyl, 8,11-dodecadienyl, 8,11-tetradecadienyl, or 8,11,14-pentadecatrienyl. In some embodiments, $R^5$ is an oligomeric glyceride moiety.

The variable n can have any suitable value. In some embodiments of any of the aforementioned embodiments, n is an integer from 7 to 100, or from 10 to 60, or from 12 to 40. In some other embodiments, n is an integer from 5 to 30, or from 7 to 25, or from 10 to 20.

In some embodiments of any of the aforementioned embodiments, the glyceride polymers include only compounds wherein at least one of $R^1$, $R^2$, $R^3$, and $R^5$, or at least one instance of $R^4$, is selected from the group consisting of: 8-nonenyl; 8-decenyl; 8-undecenyl; 10-undecenyl, 12-tridecenyl; 8-dodecenyl; 8,11-dodecadienyl; 8,11-tridecadienyl; 8,11-tetradecadienyl; 8,11-pentadecadienyl; 8,11,14-pentadecatrienyl; 8,11,14-hexadecatrienyl; 8,11,14-heptadecatrienyl; and 8,11,14-octadecatrienyl. In some other embodiments of any of the aforementioned embodiments, the glyceride polymers include only compounds wherein at least one of $R^1$, $R^2$, $R^3$, and $R^5$, or at least one instance of $R^4$, is selected from the group consisting of: 8-nonenyl; 8-decenyl; 8-undecenyl; 8-dodecenyl; 8,11-dodecadienyl; 8,11-tridecadienyl; 8,11-tetradecadienyl; 8,11-pentadecadienyl; 8,11,14-pentadecatrienyl; 8,11,14-hexadecatrienyl; 8,11,14-heptadecatrienyl; and 8,11,14-octadecatrienyl. In some other embodiments of any of the aforementioned embodiments, the glyceride polymers include only compounds wherein at least one of $R^1$, $R^2$, $R^3$, and $R^5$, or at least one instance of $R^4$, is selected from the group consisting of: 8-nonenyl; 8-undecenyl; 8,11-dodecadienyl; 8,11-tetradecadienyl; or 8,11,14-pentadecatrienyl. In some embodiments of any of the aforementioned embodiments, the glyceride polymers include only compounds wherein at least one of $R^1$, $R^2$, $R^3$, and $R^5$, or at least one instance of $R^4$, is selected from the group consisting of: 8-nonenyl; 8-decenyl; 8-undecenyl; 10-undecenyl; 12-tridecenyl; 8-dodecenyl; 8,11-dodecadienyl; 8,11-tridecadienyl; 8,11-tetradecadienyl; 8,11-pentadecadienyl; 8,11,14-pentadecatrienyl; and 8,11,14-hexadecatrienyl. In some other embodiments of any of the aforementioned embodiments, the glyceride polymers include only compounds wherein at least one of $R^1$, $R^2$, $R^3$, and $R^5$, or at least one instance of $R^4$, is selected from the group consisting of: 8-nonenyl; 8-decenyl; 8-undecenyl; 8-dodecenyl; 8,11-dodecadienyl; 8,11-tridecadienyl; 8,11-tetradecadienyl; 8,11-pentadecadienyl; 8,11,14-pentadecatrienyl; and 8,11,14-hexadecatrienyl. In some other embodiments of any of the aforementioned embodiments, the glyceride polymers include only compounds wherein at least one of $R^1$, $R^2$, $R^3$, and $R^5$, or at least one instance of $R^4$, is $C_{2-15}$ alkenyl, or $C_{2-14}$ alkenyl, or $C_{5-14}$ alkenyl, or $C_{2-13}$ alkenyl, or $C_{2-12}$ alkenyl, or $C_{5-12}$ alkenyl.

In a another aspect, glyceride copolymers, which comprises constitutional units formed from reacting two or more monomers in the presence of a metathesis catalyst, the two or more monomers comprise monomer compounds of formula (IIa):

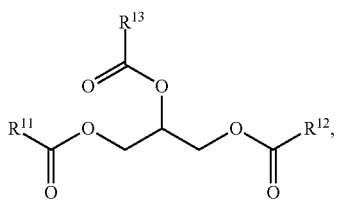

(IIa)

and monomer compounds of formula (IIb):

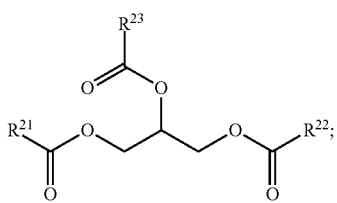

(IIb)

wherein, $R^{11}$, $R^{12}$ and $R^{13}$ are independently $C_{1-24}$ alkyl or $C_{2-24}$ alkenyl, each of which is optionally substituted one or more times by —OH, provided that at least one of $R^{11}$, $R^{12}$, and $R^{13}$ is $C_{2-24}$ alkenyl, which is optionally substituted one or more times by —OH; and $R^{21}$, $R^{22}$, and $R^{23}$ are independently $C_{1-24}$ alkyl or $C_{2-24}$ alkenyl, each of which is optionally substituted one or more times by —OH.

The variables $R^{11}$, $R^{12}$ and $R^{13}$ can have any suitable value. In some embodiments, $R^{11}$, $R^{12}$, and $R^{13}$ are independently $C_{1-24}$ alkyl, or $C_{11-24}$ alkyl, or $C_{13-24}$ alkyl, or $C_{15-24}$ alkyl. In some such embodiments, $R^{11}$, $R^{12}$, and $R^{13}$ are independently undecyl, tridecyl, pentadecyl, or heptadecyl. In some further such embodiments, $R^{11}$, $R^{12}$, and $R^{13}$ are independently pentadecyl or heptadecyl. In some embodiments of any of the aforementioned embodiments, $R^{11}$, $R^{12}$ and $R^{13}$ are independently $C_{2-24}$ alkenyl, or $C_{9-24}$ alkenyl, or $C_{11-24}$ alkenyl, or $C_{13-24}$ alkenyl, or $C_{15-24}$ alkenyl. In some such embodiments, $R^{11}$, $R^{12}$, and $R^{13}$ are independently 8-heptadecenyl, 10-heptadecenyl, 8,11-heptadecadienyl or 8,11,14-heptadecatrienyl. In some further such embodiments, $R^{11}$, $R^{12}$, and $R^{13}$ are independently 8-heptadecenyl, 8,11-heptadecadienyl, or 8,11,14-heptadecatrienyl.

The variables $R^{21}$, $R^{22}$, and $R^{23}$ can have any suitable value. In some embodiments of any of the foregoing embodiments, zero, one, or two of $R^{21}$, $R^{22}$, and $R^{23}$ are independently $C_{1-24}$ alkyl, or $C_{11-24}$ alkyl, or $C_{13-24}$ alkyl, or $C_{15-24}$ alkyl. In some such embodiments, zero, one, or two of $R^{21}$, $R^{22}$, and $R^{23}$ are independently undecyl, tridecyl, pentadecyl, or heptadecyl. In some further such embodiments, zero, one, or two of $R^{21}$, $R^{22}$, and $R^{23}$ are independently pentadecyl or heptadecyl. In some embodiments of any of the aforementioned embodiments, zero, one, or two of $R^{21}$, $R^{22}$, and $R^{23}$ are independently $C_{2-24}$ alkenyl, or $C_{9-24}$ alkenyl, or $C_{11-24}$ alkenyl, or $C_{13-24}$ alkenyl, or $C_{15-24}$ alkenyl. In some such embodiments, zero, one, or two of $R^{21}$, $R^{22}$, and $R^{23}$ are independently 8-heptadecenyl, 10-heptadecenyl, 8,11-heptadecadienyl or 8,11,14-heptadecatrienyl. In some further such embodiments, zero, one, or two of $R^{21}$, $R^{22}$, and $R^{23}$ are independently 8-heptadecenyl, 8,11-heptadecadienyl, or 8,11,14-heptadecatrienyl.

In some other embodiments of any of the foregoing embodiments, one, two, or three of $R^{21}$, $R^{22}$, and $R^{23}$ are independently $C_{2-15}$ alkenyl, or $C_{2-14}$ alkenyl, $C_{5-14}$ alkenyl, or $C_{2-13}$ alkenyl, or $C_{2-12}$ alkenyl, or $C_{5-12}$ alkenyl. In some such embodiments, one, two, or three of $R^{21}$, $R^{22}$, and $R^{23}$ are independently 8-nonenyl, 8-decenyl, 8-undecenyl, 10-undecenyl, 12-tridecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, one, two, or three of $R^{21}$, $R^{22}$, and $R^{23}$ are independently 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, one, two, or three of $R^{21}$, $R^{22}$, and $R^{23}$ are independently 8-nonenyl, 8-undecenyl, 8,11-dodecadienyl, 8,11-tetradecadienyl, or 8,11,14-pentadecatrienyl.

The glyceride copolymers disclosed herein can have any suitable molecular weight. In some embodiments of any of the aforementioned embodiments, the glyceride copolymer has a molecular weight ranging from 4,000 g/mol to 150,000 g/mol, or from 5,000 g/mol to 130,000 g/mol, or from 6,000 g/mol to 100,000 g/mol, or from 7,000 g/mol to 50,000 g/mol, or from 8,000 g/mol to 30,000 g/mol, or from 9,000 g/mol to 20,000 g/mol.

The glyceride copolymers disclosed herein can have any suitable ratio of constitutional units formed from monomer compounds of formula (IIa) to constitutional units formed from monomer compounds of formula (IIb). In some embodiments of any of the aforementioned embodiments, the number ratio of constitutional units formed from monomer compounds of formula (IIa) to constitutional units formed from monomer compounds of formula (IIb) is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. The glyceride copolymers disclosed herein can include additional constitutional units not formed from monomer compounds of either formula (IIa) or formula (IIb), including, but not limited to, constitutional units formed from other unsaturated polyol esters, such as unsaturated diols, triols, and the like.

Or, in some other embodiments of any of the foregoing embodiments, the two or more monomers are reacted in the presence of the metathesis catalyst as part of a reaction mixture, wherein the weight-to-weight ratio of the monomer compounds of formula (IIa) to the monomer compounds of formula (IIb) in the reaction mixture is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. In some embodiments, the reaction mixture includes additional monomer compounds besides monomer compounds of formula (IIa) and formula (IIb).

Any suitable metathesis catalyst can be used, as described in more detail below. In some embodiments of any of the aforementioned embodiments, the metathesis catalyst is an organoruthenium compound, an organoosmium compound, an organotungsten compound, or an organomolybdenum compound.

In a another aspect, the disclosure provides glyceride copolymers, which comprises constitutional units formed from reacting two or more monomers in the presence of a first metathesis catalyst, the two or more monomers comprise a first monomer and a second monomer; wherein the first monomer is a first unsaturated natural oil glyceride, and the second monomer is an unsaturated alkenylized natural oil glyceride.

In some embodiments, the unsaturated alkenylized natural oil glyceride is formed from the reaction of a second unsaturated natural oil glyceride with a short-chain alkene in the presence of a second metathesis catalyst. In some such embodiments, the unsaturated alkenylized natural oil glyceride has a lower molecular weight than the second unsaturated natural oil glyceride. Any suitable short-chain alkene can be used, according to the embodiments described above. In some embodiments, the short-chain alkene is a $C_{2-8}$ olefin, or a $C_{2-6}$ olefin. In some such embodiments, the short-chain alkene is ethylene, propylene, 1-butene, 2-butene, isobutene, 1-pentene, 2-pentene, 1-hexene, 2-hexene, or 3-hexene. In some further such embodiments, the short-chain alkene is ethylene, propylene, 1-butene, 2-butene, or isobutene. In some embodiments, the short-chain alkene is ethylene. In some embodiments, the short-chain alkene is propylene. In some embodiments, the short-chain alkene is 1-butene. In some embodiments, the short-chain alkene is 2-butene. In some other embodiments, the short-chain alkene is a branched short-chain alkene. Non-limiting examples of such branched short-chain alkenes include, but are not limited to, isobutylene, 3-methyl-1-butene, 3-methyl-1-pentene, and 4-methyl-1-pentene.

The first unsaturated natural oil glyceride and the second unsaturated natural oil glyceride can be obtained from any suitable natural oil source. In some embodiments of any of the aforementioned embodiments, the first or second unsaturated natural oil glycerides are obtained from a vegetable oil, such as a seed oil. In some further embodiments, the vegetable oil is rapeseed oil, canola oil (low erucic acid rapeseed oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, or castor oil. In some embodiments, the vegetable oil is palm oil. In some embodiments, the vegetable oil is soybean oil. In some embodiments, the vegetable oil is canola oil.

The glyceride copolymers disclosed herein can have any suitable molecular weight. In some embodiments of any of the aforementioned embodiments, the glyceride copolymer has a molecular weight ranging from 4,000 g/mol to 150,000 g/mol, or from 5,000 g/mol to 130,000 g/mol, or from 6,000 g/mol to 100,000 g/mol, or from 7,000 g/mol to 50,000 g/mol, or from 8,000 g/mol to 30,000 g/mol, or from 9,000 g/mol to 20,000 g/mol.

The glyceride copolymers disclosed herein can have any suitable ratio of constitutional units formed from the first monomer to constitutional units formed from the second monomer. In some embodiments of any of the aforementioned embodiments, the number ratio of constitutional units formed from the first monomer to constitutional units formed from the second monomer is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. The glyceride copolymers disclosed herein can include additional constitutional units not formed from the first monomer or the second monomer, including, but not limited to, constitutional units formed from other unsaturated polyol esters, such as unsaturated diols, triols, and the like.

Or, in some other embodiments of any of the foregoing embodiments, the two or more monomers are reacted in the presence of the metathesis catalyst as part of a reaction mixture, wherein the weight-to-weight ratio of the first monomer to the second monomer in the reaction mixture is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. In some embodiments, the reaction mixture includes additional monomer compounds besides the first monomer and the second monomer.

Any suitable metathesis catalyst can be used as either the first metathesis catalyst or the second metathesis catalyst, as described in more detail below. In some embodiments of any of the aforementioned embodiments, the first and second metathesis catalysts are an organoruthenium compound, an organoosmium compound, an organotungsten compound, or an organomolybdenum compound.

Additional glyceride copolymers are contemplated as products of the synthetic methods and examples disclosed herein.

Glyceride Oligomer Compositions

In another aspect, the disclosure provides compositions comprising one or more glyceride copolymers of any of the foregoing aspects and embodiments thereof.

In some embodiments, the composition can contain glyceride copolymers having a range of molecular weights. Thus, in some embodiments, the number-average molecular weight ($M_n$) of the one or more glyceride copolymers in the composition ranges from 4,000 g/mol to 150,000 g/mol, or from 5,000 g/mol to 30,000 g/mol, or from 6,000 g/mol to 20,000 g/mol. In some embodiments, the weight-average molecular weight ($M_w$) of the one or more glyceride copolymers in the composition ranges from 8,000 g/mol to 200,000 g/mol, or from 9,000 g/mol to 100,000 g/mol, or from 10,000 g/mol to 30,000 g/mol, or from 11,000 g/mol to 20,000 g/mol, or from 8,000 g/mol to 20,000 g/mol, or from 9,000 g/mol to 15,000 g/mol, or from 10,000 to 14,000 g/mol. In some embodiments, the polydispersity index, as calculated as $M_w/M_n$, of the one or more glyceride copolymers in the composition ranges from 1.0 to 10, or from 1.5 to 7, or from 2 to 6.

The composition can exist in any suitable form, such as in a single lipid phase, or in two or more phases, such as compounds having a lipid phase and an aqueous phase. In some such embodiments, the composition is an emulsion, where the emulsion comprises an aqueous phase and a non-aqueous (oil) phase. In some embodiments, the emulsion is an oil-in-water emulsion, such that the aqueous phase serves as a continuous phase and the oil phase serves as a discontinuous phase. In some other embodiments, the emulsion is a water-in-oil emulsion, such that the oil phase serves as a continuous phase and the aqueous phase serves as a discontinuous phase.

The compositions of any of the foregoing embodiments can, in some embodiments, also include one or more surfactants. Any suitable surfactants can be used, such as cationic surfactants, anionic surfactants, nonionic surfactants, or any combination thereof.

The compositions of any of the foregoing embodiments can, in some embodiments, also include one or more additives. Any suitable additives can be used, such as carriers, solvents, co-solvents, emulsifiers, natural or synthetic colorants, natural or synthetic fragrances, natural or synthetic deodorizers, antioxidants, corrosion inhibitors, thickening agents, dispersants, chelating agents, precipitating agents, sequestering agents, buffers, and antimicrobial agents.

Other suitable compositions are contemplated, according to the particular uses of the composition. In some embodiments, the composition is not a baby care composition. In some embodiments, the composition is not a beauty care composition. In some embodiments, the composition is not a fabric care composition. In some embodiments, the composition is not a home care composition. In some embodiments, the composition is not a feminine care composition. In some embodiments, the composition is not a family care composition.

Synthetic Methods

In a fifth aspect, the disclosure provides methods of forming a glyceride copolymer composition, the methods comprising: (a) providing a reaction mixture comprising a metathesis catalyst and monomer compounds of formula (IIIa):

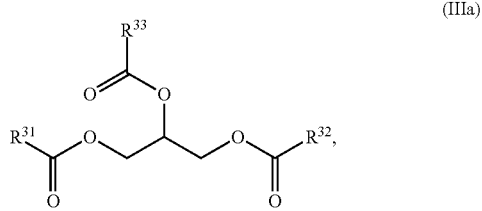

and monomer compounds of formula (IIb):

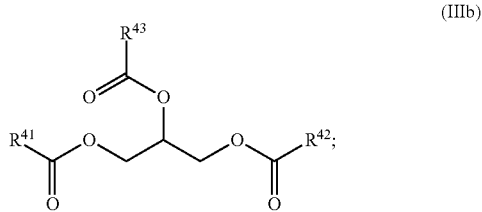

wherein, $R^{31}$, $R^{32}$, and $R^{33}$ are independently $C_{1-24}$ alkyl or $C_{2-24}$ alkenyl, each of which is optionally substituted one or more times by —OH, provided that at least one of $R^{31}$, $R^{32}$, and $R^{33}$ is $C_{2-24}$ alkenyl, which is optionally substituted one or more times by —OH; and $R^{41}$, $R^{42}$, and $R^{43}$ are independently $C_{1-24}$ alkyl or $C_{2-24}$ alkenyl, each of which is optionally substituted one or more times by —OH, provided that at least one of $R^{41}$, $R^{42}$, and $R^{43}$ is 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl; and (b) reacting the monomer compounds of formula (IIIa) with the monomer compounds of formula (IIIb) in the presence of the metathesis catalyst to form the glyceride polymer composition.

The variables $R^{31}$, $R^{32}$, and $R^{33}$ can have any suitable value. In some embodiments, $R^{31}$, $R^{32}$, and $R^{33}$ are independently $C_{1-24}$ alkyl, or $C_{11-24}$ alkyl, or $C_{13-24}$ alkyl, or $C_{15-24}$ alkyl. In some such embodiments, $R^{31}$, $R^{32}$, and $R^{33}$ are independently undecyl, tridecyl, pentadecyl, or heptadecyl. In some further such embodiments, $R^{31}$, $R^{32}$, and $R^{33}$ are independently pentadecyl or heptadecyl. In some embodiments of any of the aforementioned embodiments, $R^{31}$, $R^{32}$, and $R^{33}$ are independently $C_{2-24}$ alkenyl, or $C_{9-24}$ alkenyl, or $C_{11-24}$ alkenyl, or $C_{13-24}$ alkenyl, or $C_{15-24}$ alkenyl. In some such embodiments, $R^{31}$, $R^{32}$, and $R^{33}$ are independently 8-heptadecenyl, 10-heptadecenyl, 8,11-heptadecadienyl or 8,11,14-heptadecatrienyl. In some further such embodiments, $R^{31}$, $R^{32}$, and $R^{33}$ are independently 8-heptadecenyl, 8,11-heptadecadienyl, or 8,11,14-heptadecatrienyl.

The variables $R^{41}$, $R^{42}$, and $R^{43}$ can have any suitable value. In some embodiments of any of the foregoing embodiments, zero, one, or two of $R^{41}$, $R^{42}$, and $R^{43}$ are independently $C_{1-24}$ alkyl, or $C_{11-24}$ alkyl, or $C_{13-24}$ alkyl, or $C_{15-24}$ alkyl. In some such embodiments, zero, one, or two of $R^{41}$, $R^{42}$, and $R^{43}$ are independently undecyl, tridecyl, pentadecyl, or heptadecyl. In some further such embodiments, zero, one, or two of $R^{41}$, $R^{42}$, and $R^{43}$ are independently pentadecyl or heptadecyl. In some embodiments of any of the aforementioned embodiments, zero, one, or two of $R^{41}$, $R^{42}$, and $R^{43}$ are independently $C_{2-24}$ alkenyl, or $C_{9-24}$ alkenyl, or $C_{11-24}$ alkenyl, or $C_{13-24}$ alkenyl, or $C_{15-24}$ alkenyl. In some such embodiments, zero, one, or two of $R^{41}$, $R^{42}$, and $R^{43}$ are independently 8-heptadecenyl, 10-heptadecenyl, 8,11-heptadecadienyl or 8,11,14-heptadecatrienyl. In some further such embodiments, zero, one, or two of $R^{41}$, $R^{42}$, and $R^{43}$ are independently 8-heptadecenyl, 8,11-heptadecadienyl, or 8,11,14-heptadecatrienyl.

In some other embodiments of any of the foregoing embodiments, one, two, or three of $R^{41}$, $R^{42}$, and $R^{43}$ are independently $C_{2-15}$ alkenyl, or $C_{2-14}$ alkenyl, or $C_{2-13}$ alkenyl, or $C_{2-12}$ alkenyl, or $C_{5-12}$ alkenyl. In some such embodiments, one, two, or three of $R^{41}$, $R^{42}$, and $R^{43}$ are independently 8-nonenyl, 8-decenyl, 8-undecenyl, 10-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, one, two, or three of $R^{41}$, $R^{42}$, and $R^{43}$ are independently 8-nonenyl, 8-decenyl, 8-undecenyl, 8-dodecenyl, 8,11-dodecadienyl, 8,11-tridecadienyl, 8,11-tetradecadienyl, 8,11-pentadecadienyl, 8,11,14-pentadecatrienyl, 8,11,14-hexadecatrienyl, 8,11,14-heptadecatrienyl, or 8,11,14-octadecatrienyl. In some further such embodiments, one, two, or three of $R^{41}$, $R^{42}$, and $R^{43}$ are independently 8-nonenyl, 8-undecenyl, 8,11-dodecadienyl, 8,11-tetradecadienyl, or 8,11-pentadecatrienyl.

The glyceride copolymers formed by the methods disclosed herein can have any suitable molecular weight. In some embodiments of any of the aforementioned embodiments, the glyceride copolymer has a molecular weight ranging from 4,000 g/mol to 150,000 g/mol, or from 5,000 g/mol to 130,000 g/mol, or from 6,000 g/mol to 100,000 g/mol, or from 7,000 g/mol to 50,000 g/mol, or from 8,000 g/mol to 30,000 g/mol, or from 9,000 g/mol to 20,000 g/mol.

The glyceride copolymers formed by the methods disclosed herein can have any suitable ratio of constitutional units formed from monomer compounds of formula (IIIa) to constitutional units formed from monomer compounds of formula (IIIb). In some embodiments of any of the aforementioned embodiments, the number ratio of constitutional units formed from monomer compounds of formula (IIIa) to constitutional units formed from monomer compounds of formula (IIIb) is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. The glyceride copolymers disclosed herein can include additional constitutional units not formed from monomer compounds of either formula (IIIa) or formula (IIIb).

Or, in some other embodiments of any of the foregoing embodiments, the two or more monomers are reacted in the presence of the metathesis catalyst as part of a reaction mixture, wherein the weight-to-weight ratio of the monomer compounds of formula (IIIa) to the monomer compounds of formula (IIIb) in the reaction mixture is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. In some embodiments, the reaction mixture includes additional monomer compounds besides monomer compounds of formula (IIIa) and formula (IIIb).

Any suitable metathesis catalyst can be used, as described in more detail below. In some embodiments of any of the aforementioned embodiments, the metathesis catalyst is an organoruthenium compound, an organoosmium compound, an organotungsten compound, or an organomolybdenum compound.

The methods disclosed herein can include additional chemical and physical treatment of the resulting glyceride copolymers. For example, in some embodiments, the resulting glyceride copolymers are subjected to full or partial hydrogenation, such as diene-selective hydrogenation. Also, in some embodiments, the unspent metathesis catalyst and/ or the spent metathesis catalyst residues are recovered. In some embodiments of any of the foregoing embodiments, the resulting glyceride polymers are subjected to methods that induce isomerization, such as olefin isomerization.

In another aspect, the disclosure provides methods of forming a glyceride copolymer, the methods comprising: (a) providing a reaction mixture comprising a first metathesis catalyst, unsaturated natural oil glycerides, and unsaturated alkenylized natural oil glycerides; and (b) reacting the unsaturated natural oil glycerides and unsaturated alkenylized natural oil glycerides in the presence of the first metathesis catalyst to form the glyceride copolymer.

In some embodiments, the unsaturated alkenylized natural oil glyceride is formed from the reaction of a second unsaturated natural oil glyceride with a short-chain alkene in the presence of a second metathesis catalyst. In some such embodiments, the unsaturated alkenylized natural oil glyceride has a lower molecular weight than the second unsaturated natural oil glyceride. Any suitable short-chain alkene can be used, according to the embodiments described above. In some embodiments, the short-chain alkene is a $C_{2-8}$ olefin, or a $C_{2-6}$ olefin. In some such embodiments, the short-chain alkene is ethylene, propylene, 1-butene, 2-butene, isobutene, 1-pentene, 2-pentene, 1-hexene, 2-hexene, or 3-hexene. In some further such embodiments, the short-chain alkene is ethylene, propylene, 1-butene, 2-butene, or isobutene. In some embodiments, the short-chain alkene is ethylene. In some embodiments, the short-chain alkene is propylene. In some embodiments, the short-chain alkene is 1-butene. In some embodiments, the short-chain alkene is 2-butene.

The first unsaturated natural oil glyceride and the second unsaturated natural oil glyceride can be obtained from any suitable natural oil source. In some embodiments of any of the aforementioned embodiments, the first or second unsaturated natural oil glycerides are obtained from a vegetable oil, such as a seed oil. In some further embodiments, the vegetable oil is rapeseed oil, canola oil (low erucic acid rapeseed oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, or castor oil. In some embodiments, the vegetable oil is palm oil. In some embodiments, the vegetable oil is soybean oil. In some embodiments, the vegetable oil is canola oil.

The glyceride copolymers formed by the methods disclosed herein can have any suitable molecular weight. In some embodiments of any of the aforementioned embodiments, the glyceride copolymer has a molecular weight ranging from 4,000 g/mol to 150,000 g/mol, or from 5,000 g/mol to 130,000 g/mol, or from 6,000 g/mol to 100,000 g/mol, or from 7,000 g/mol to 50,000 g/mol, or from 8,000 g/mol to 30,000 g/mol, or from 9,000 g/mol to 20,000 g/mol.

The glyceride copolymers formed by the methods disclosed herein can have any suitable ratio of constitutional units formed from the first monomer to constitutional units formed from the second monomer. In some embodiments of any of the aforementioned embodiments, the number ratio of constitutional units formed from the first monomer to constitutional units formed from the second monomer is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. The glyceride copolymers disclosed herein can include additional constitutional units not formed from the first monomer or the second monomer.

Or, in some other embodiments of any of the foregoing embodiments, the two or more monomers are reacted in the presence of the metathesis catalyst as part of a reaction mixture, wherein the weight-to-weight ratio of the first monomer to the second monomer in the reaction mixture is no more than 10:1, or no more than 9:1, or no more than 8:1, or no more than 7:1, or no more than 6:1, or no more than 5:1, or no more than 4:1, or no more than 3:1, or no more than 2:1, or no more than 1:1. In some embodiments, the reaction mixture includes additional monomer compounds besides the first monomer and the second monomer.

Any suitable metathesis catalyst can be used as either the first metathesis catalyst or the second metathesis catalyst, as described in more detail below. In some embodiments of any of the aforementioned embodiments, the first and second metathesis catalysts are an organoruthenium compound, an organoosmium compound, an organotungsten compound, or an organomolybdenum compound.

The methods disclosed herein can include additional chemical and physical treatment of the resulting glyceride copolymers. For example, in some embodiments, the resulting glyceride copolymers are subjected to full or partial hydrogenation, such as diene-selective hydrogenation.

Derivation from Renewable Sources

The compounds employed in any of the aspects or embodiments disclosed herein can, in certain embodiments, be derived from renewable sources, such as from various natural oils or their derivatives. Any suitable methods can be used to make these compounds from such renewable sources.

Olefin metathesis provides one possible means to convert certain natural oil feedstocks into olefins and esters that can be used in a variety of applications, or that can be further modified chemically and used in a variety of applications. In some embodiments, a composition (or components of a composition) may be formed from a renewable feedstock, such as a renewable feedstock formed through metathesis reactions of natural oils and/or their fatty acid or fatty ester derivatives. When compounds containing a carbon-carbon double bond undergo metathesis reactions in the presence of a metathesis catalyst, some or all of the original carbon-carbon double bonds are broken, and new carbon-carbon double bonds are formed. The products of such metathesis reactions include carbon-carbon double bonds in different locations, which can provide unsaturated organic compounds having useful chemical properties.

A wide range of natural oils, or derivatives thereof, can be used in such metathesis reactions. Examples of suitable natural oils include, but are not limited to, vegetable oils, algae oils, fish oils, animal fats, tall oils, derivatives of these oils, combinations of any of these oils, and the like. Representative non-limiting examples of vegetable oils include rapeseed oil (canola oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil. Representative non-limiting examples of animal fats include lard, tallow, poultry fat, yellow grease, and fish oil. Tall oils are by-products of wood pulp manufacture. In some embodiments, the natural oil or natural oil feedstock comprises one or more unsaturated glycerides (e.g., unsaturated triglycerides). In some such embodiments, the natural oil feedstock comprises at least 50% by weight, or at least 60% by weight, or at least 70% by weight, or at least 80% by weight, or at least 90% by weight, or at least 95% by weight, or at least 97% by weight, or at least 99% by weight of one or more unsaturated triglycerides, based on the total weight of the natural oil feedstock.

The natural oil may include canola or soybean oil, such as refined, bleached and deodorized soybean oil (i.e., RBD soybean oil). Soybean oil typically includes about 95 percent by weight (wt %) or greater (e.g., 99 wt % or greater) triglycerides of fatty acids. Major fatty acids in the polyol esters of soybean oil include but are not limited to saturated fatty acids such as palmitic acid (hexadecanoic acid) and stearic acid (octadecanoic acid), and unsaturated fatty acids such as oleic acid (9-octadecenoic acid), linoleic acid (9,12-octadecadienoic acid), and linolenic acid (9,12,15-octadecatrienoic acid).

Such natural oils, or derivatives thereof, contain esters, such as triglycerides, of various unsaturated fatty acids. The identity and concentration of such fatty acids varies depending on the oil source, and, in some cases, on the variety. In some embodiments, the natural oil comprises one or more esters of oleic acid, linoleic acid, linolenic acid, or any combination thereof. When such fatty acid esters are metathesized, new compounds are formed. For example, in embodiments where the metathesis uses certain short-chain alkenes, e.g., ethylene, propylene, or 1-butene, and where the natural oil includes esters of oleic acid, an amount of 1-decene and 1-decenoid acid (or an ester thereof), among other products, are formed.

In some embodiments, the natural oil can be subjected to various pre-treatment processes, which can facilitate their utility for use in certain metathesis reactions. Useful pre-treatment methods are described in United States Patent Application Publication Nos. 2011/0113679, 2014/0275595, and 2014/0275681, all three of which are hereby incorporated by reference as though fully set forth herein.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions.

The conditions for such metathesis reactions, and the reactor design, and suitable catalysts are as described below with reference to the metathesis of the olefin esters. That discussion is incorporated by reference as though fully set forth herein.

Olefin Metathesis

In some embodiments, one or more of the unsaturated monomers can be made by metathesizing a natural oil or natural oil derivative. The terms "metathesis" or "metathesizing" can refer to a variety of different reactions, including, but not limited to, cross-metathesis, self-metathesis, ring-opening metathesis, ring-opening metathesis polymerizations ("ROMP"), ring-closing metathesis ("RCM"), and acyclic diene metathesis ("ADMET"). Any suitable metathesis reaction can be used, depending on the desired product or product mixture.

In some embodiments, after any optional pre-treatment of the natural oil feedstock, the natural oil feedstock is reacted in the presence of a metathesis catalyst in a metathesis reactor. In some other embodiments, an unsaturated ester (e.g., an unsaturated glyceride, such as an unsaturated triglyceride) is reacted in the presence of a metathesis catalyst in a metathesis reactor. These unsaturated esters may be a component of a natural oil feedstock, or may be derived from other sources, e.g., from esters generated in earlier-performed metathesis reactions. In certain embodiments, in the presence of a metathesis catalyst, the natural oil or unsaturated ester can undergo a self-metathesis reaction with itself.

In some embodiments, the metathesis comprises reacting a natural oil feedstock (or another unsaturated ester) in the presence of a metathesis catalyst. In some such embodiments, the metathesis comprises reacting one or more unsaturated glycerides (e.g., unsaturated triglycerides) in the natural oil feedstock in the presence of a metathesis catalyst. In some embodiments, the unsaturated glyceride comprises one or more esters of oleic acid, linoleic acid, linoleic acid, or combinations thereof. In some other embodiments, the unsaturated glyceride is the product of the partial hydrogenation and/or the metathesis of another unsaturated glyceride (as described above).

The metathesis process can be conducted under any conditions adequate to produce the desired metathesis products. For example, stoichiometry, atmosphere, solvent, temperature, and pressure can be selected by one skilled in the art to produce a desired product and to minimize undesirable byproducts. In some embodiments, the metathesis process may be conducted under an inert atmosphere. Similarly, in embodiments where a reagent is supplied as a gas, an inert gaseous diluent can be used in the gas stream. In such embodiments, the inert atmosphere or inert gaseous diluent typically is an inert gas, meaning that the gas does not interact with the metathesis catalyst to impede catalysis to a substantial degree. For example, non-limiting examples of inert gases include helium, neon, argon, methane, and nitrogen, used individually or with each other and other inert gases.

The reactor design for the metathesis reaction can vary depending on a variety of factors, including, but not limited to, the scale of the reaction, the reaction conditions (heat, pressure, etc.), the identity of the catalyst, the identity of the materials being reacted in the reactor, and the nature of the feedstock being employed. Suitable reactors can be designed by those of skill in the art, depending on the relevant factors, and incorporated into a refining process such, such as those disclosed herein.

The metathesis reactions disclosed herein generally occur in the presence of one or more metathesis catalysts. Such methods can employ any suitable metathesis catalyst. The metathesis catalyst in this reaction may include any catalyst or catalyst system that catalyzes a metathesis reaction. Any known metathesis catalyst may be used, alone or in combination with one or more additional catalysts. Examples of metathesis catalysts and process conditions are described in US 2011/0160472, incorporated by reference herein in its entirety, except that in the event of any inconsistent disclosure or definition from the present specification, the disclosure or definition herein shall be deemed to prevail. A number of the metathesis catalysts described in US 2011/0160472 are presently available from Materia, Inc. (Pasadena, Calif.).

In some embodiments, the metathesis catalyst includes a Grubbs-type olefin metathesis catalyst and/or an entity derived therefrom. In some embodiments, the metathesis catalyst includes a first-generation Grubbs-type olefin metathesis catalyst and/or an entity derived therefrom. In some embodiments, the metathesis catalyst includes a second-generation Grubbs-type olefin metathesis catalyst and/or an entity derived therefrom. In some embodiments, the metathesis catalyst includes a first-generation Hoveyda-Grubbs-type olefin metathesis catalyst and/or an entity derived therefrom. In some embodiments, the metathesis catalyst includes a second-generation Hoveyda-Grubbs-type olefin metathesis catalyst and/or an entity derived therefrom. In some embodiments, the metathesis catalyst includes one or a plurality of the ruthenium carbene metathesis catalysts sold by Materia, Inc. of Pasadena, Calif. and/or one or more entities derived from such catalysts. Representative metathesis catalysts from Materia, Inc. for use in accordance with the present teachings include but are not limited to those sold under the following product numbers as well as combinations thereof: product no. C823 (CAS no. 172222-30-9), product no. C848 (CAS no. 246047-72-3), product no. C601 (CAS no. 203714-71-0), product no. C627 (CAS no. 301224-40-8), product no. C571 (CAS no. 927429-61-6), product no. C598 (CAS no. 802912-44-3), product no. C793 (CAS no. 927429-60-5), product no. C801 (CAS no. 194659-03-9), product no. C827 (CAS no. 253688-91-4), product no. C884 (CAS no. 900169-53-1), product no. C833 (CAS no. 1020085-61-3), product no. C859 (CAS no. 832146-68-6), product no. C711 (CAS no. 635679-24-2), product no. C933 (CAS no. 373640-75-6).

In some embodiments, the metathesis catalyst includes a molybdenum and/or tungsten carbene complex and/or an entity derived from such a complex. In some embodiments, the metathesis catalyst includes a Schrock-type olefin metathesis catalyst and/or an entity derived therefrom. In some embodiments, the metathesis catalyst includes a high-oxidation-state alkylidene complex of molybdenum and/or an entity derived therefrom. In some embodiments, the metathesis catalyst includes a high-oxidation-state alkylidene complex of tungsten and/or an entity derived therefrom. In some embodiments, the metathesis catalyst includes molybdenum (VI). In some embodiments, the metathesis catalyst includes tungsten (VI). In some embodiments, the metathesis catalyst includes a molybdenum- and/or a tungsten-containing alkylidene complex of a type described in one or more of (a) Angew. Chem. Int. Ed. Engl., 2003, 42, 4592-4633; (b) Chem. Rev., 2002, 102, 145-179; and/or (c) Chem. Rev., 2009, 109, 3211-3226, each of which is incorporated by reference herein in its entirety, except that in the event of any inconsistent disclosure or definition from the present specification, the disclosure or definition herein shall be deemed to prevail.

In certain embodiments, the metathesis catalyst is dissolved in a solvent prior to conducting the metathesis reaction. In certain such embodiments, the solvent chosen may be selected to be substantially inert with respect to the metathesis catalyst. For example, substantially inert solvents include, without limitation: aromatic hydrocarbons, such as benzene, toluene, xylenes, etc.; halogenated aromatic hydrocarbons, such as chlorobenzene and dichlorobenzene; aliphatic solvents, including pentane, hexane, heptane, cyclohexane, etc.; and chlorinated alkanes, such as dichloromethane, chloroform, dichloroethane, etc. In some embodiments, the solvent comprises toluene.

In other embodiments, the metathesis catalyst is not dissolved in a solvent prior to conducting the metathesis reaction. The catalyst, instead, for example, can be slurried with the natural oil or unsaturated ester, where the natural oil or unsaturated ester is in a liquid state. Under these conditions, it is possible to eliminate the solvent (e.g., toluene) from the process and eliminate downstream olefin losses when separating the solvent. In other embodiments, the metathesis catalyst may be added in solid state form (and not slurried) to the natural oil or unsaturated ester (e.g., as an auger feed).

The metathesis reaction temperature may, in some instances, be a rate-controlling variable where the temperature is selected to provide a desired product at an acceptable rate. In certain embodiments, the metathesis reaction temperature is greater than −40° C., or greater than −20° C., or greater than 0° C., or greater than 10° C. In certain embodiments, the metathesis reaction temperature is less than 200° C., or less than 150° C., or less than 120° C. In some embodiments, the metathesis reaction temperature is between 0° C. and 150° C., or is between 10° C. and 120° C.

EXAMPLES

The following examples show certain illustrative embodiments of the compounds, compositions, and methods disclosed herein. These examples are not to be taken as limiting in any way. Nor should the examples be taken as expressing any preferred embodiments, or as indicating any direction for further research. Unless otherwise noted, chemicals used were ACS, reagent, or the standard grade available from Sigma-Aldrich.

The examples below report the determination of molecular weight by gel permeation chromatography (GPC) for certain compositions containing glyceride copolymers. Weight-average molecular weight ($M_w$) values were determined as follows.

Sample molecular weights were determined on an Agilent 1260 HPLC system equipped with autosampler, column oven, and refractive index detector. The operating system was OpenLAB CDS ChemStation Workstation (A.01.03). Data storage and analysis were performed with Cirrus GPC offline, GPC/SEC Software for ChemStation, version 3.4. Chromatographic conditions are given in Table 1. In carrying out the calculation, the results were calibrated using polystyrene reference samples having known molecular weights. Measurements of $M_w$ values vary by 5% or less. Unless noted otherwise, the molecular weight analyses were determined using a chloroform mobile phase. As specifically noted below in examples 6 and 7, as well as for the corresponding polystyrene calibration curve, tetrahydrofuran was used in place of chloroform as the mobile phase.

TABLE 1

| Parameter | Conditions |
|---|---|
| Column Set | Three ResiPore columns (Agilent #1113-6300) in series with guard column (Agilent #1113-1300) Particle size: 3 μm Column dimensions: 300 × 7.5 mm |
| Mobile Phase | Chloroform |
| Flow Rate | 1 mL/min, needle wash is included |
| Column Temperature | 40° C. |
| Injection Volume | 20 μL |
| Detector | Refractive Index |
| Detector Temperature | 40° C. |

Table 2 shows the molecular weights and the retention times of the polystyrene standards.

TABLE 2

| Standard Number | Average Reported MW | Retention Time (min) |
|---|---|---|
| 1 | 150,000 | 19.11 |
| 2 | 100,000 | 19.63 |
| 3 | 70,000 | 20.43 |
| 4 | 50,000 | 20.79 |
| 5 | 30,000 | 21.76 |
| 6 | 9,000 | 23.27 |
| 7 | 5,000 | 23.86 |
| 8 | 1,000 | 27.20 |
| 9 | 500 | 28.48 |

Example 1—Reaction with Butenylized Canola Oil (BCO): Effect of BCO Content

The experimental apparatus consisted of a three-necked round-bottom flask equipped with a magnetic stir bar, a septum cap, and an outlet to a vacuum system. External heating was provided via a silicone oil bath. The septum was used to add metathesis catalyst and withdraw samples. The vacuum system consisted of a TEFLON diaphragm pump and a pressure controller.

Butenylized canola oil (BCO) was made by cross-metathesizing canola oil (Wesson) with 1-butene (1 mol of 1-butene per mol of C═C double bonds in the oil) according to the methods described in U.S. Pat. No. 8,957,268. The BCO was mixed with canola oil (Wesson) and charged to a 500-mL round-bottom flask. The oil mixture was purged with nitrogen gas (Airgas, UHP) for about 15 minutes. The reaction flask was heated to about 70° C. and evacuated to the desired pressure (see below: 200 or 450 torr absolute.) A toluene (Sigma-Aldrich, anhydrous 99.8%) solution of C827 metathesis catalyst (10 mg/mL; Materia, Inc., Pasadena, Calif., USA) was added to the oil mixture to achieve a catalyst level of 100 ppmwt. The reaction was held at 70° C. while maintaining a dynamic vacuum at the desired pressure for 2 hours. A small sample of the reaction mixture was removed by syringe, quenched with ethyl vinyl ether (Sigma-Aldrich), and analyzed by GPC to determine the weight-average molecular weight ($M_w$) of the resulting glyceride oligomers.

Table 3 shows the resulting $M_w$ for 13 different reactions, where the percentage of BCO was increased. The percentage of BCO reported is a weight percentage of BCO relative to the total weight of oil (BCO and canola oil combined). The molecular weights are reported in units of g/mol.

TABLE 3

| Percentage BCO (wt %) | $M_w$ 450 Torr (absolute) Experiments | $M_w$ 200 Torr (absolute) Experiments |
|---|---|---|
| 0 | 11,700 | 12,300 |
| 10 | 12,800 | 13,100 |
| 30 | 13,600 | 14,800 |
| 50 | 14,400 | 18,000 |
| 70 | 14,100 | 22,500 |
| 90 | 14,500 | — |
| 100 | 25,900 | 56,600 |

Example 2—Reaction with Butenylized Canola Oil (BCO): Effect of Reaction Time Using the same apparatus and procedures as those described in Example 1, 50 wt %/50 wt % mixtures of BCO and canola oil were reacted for four hours while maintaining a dynamic vacuum at either 200 or 450 torr (absolute) with samples being taken hourly. Table 4 shows the molecular weight ($M_w$) over time. The molecular weight ($M_w$) is reported in units of g/mol.

TABLE 4

| Time (hr) | $M_w$ 450 Torr (absolute) Experiments | $M_w$ 200 Torr (absolute) Experiments |
|---|---|---|
| 1 | 13,600 | 16,100 |
| 2 | 13,600 | 18,000 |
| 3 | 13,100 | 19,000 |
| 4 | 13,000 | 20,000 |

Example 3—Cross-Metathesis of Canola Oil with Butenylized Palm Oil (BPO): Effect of Feedstock Composition Using the same apparatus and procedures as those described in Example 1, mixtures of BPO (Wilmar) and palm oil were reacted for two hours. Table 5 shows the molecular weight ($M_w$) after two hours. The molecular weight ($M_w$) is reported in units of g/mol.

TABLE 5

| Percentage BPO (wt %) | $M_w$ 200 Torr (absolute) Experiment |
|---|---|
| 15 | 9,400 |
| 25 | 8,100 |
| 35 | 5,900 |

Example 4—Canola Oil Self-Metathesis (Comparative Example)

Using the same apparatus (except that a two-stage rotary vane pump was used for experiments run under dynamic vacuums of less than 10 torr absolute and procedure described in Example 1, canola oil was reacted for two hours. Table 6 shows the molecular weight ($M_w$) after two hours. The molecular weight ($M_w$) is reported in units of g/mol.

TABLE 6

| Absolute Pressure (Torr) | 100-g Scale ($M_w$) | 1-kg Scale ($M_w$) |
|---|---|---|
| 450 | 11,700 | — |
| 200 | 12,300 | — |
| 75 | 12,600 | — |
| 8 | 14,500 | 13,600 |
| 3.2 | — | 15,100 |
| 2.5 | — | 15,900 |

A portion (473 g) of the product from the 1 kg experiment run at 2.5 torr was diluted with heptane (BDH, laboratory reagent, 500 mL). Magnesol-600-R (Dallas Group of Am., 10 g) was added and the resulting mixture was stirred under nitrogen at ambient temperature for 30 minutes. The Magnesol-600-R was removed by vacuum filtration. A fresh charge of Magnesol-600-R (10 g) was added and the resulting mixture was stirred under nitrogen at ambient temperature for 30 minutes. Heptane was removed by rotovap. Olefins were removed by vacuum distillation in a 1 L three-neck round-bottom equipped with a short-path distillation head; a condenser chilled to 5° C.; a 20 mL round bottom flask chiller with dry-ice/isopropanol; a magnetic stir bar; and thermometers to measure liquid temperature and vapor temperature. Heating was supplied through a resistive heating mantle. Vacuum was supplied by a two-stage rotary vane vacuum pump. The bulk of olefinic material was removed by gradually increasing the heat input. A very small nitrogen purge was maintained on the system for the initial part of the distillation. The final pressure was about 0.1 torr absolute and the final liquid temperature was 192° C. The olefin content was less than 1% by mass. A sample of the final product was trans-esterified with methanol and analyzed by GC. See Table 7 (below).

Example 5—Cross-Metathesis of Canola with Butenylized Canola Oil (BCO) on One-Kilogram Scale with Catalyst Removal and Olefin Stripping Using a similar metathesis procedure and apparatus to the one described in Example 1, a 1 kg mixture of BCO and canola oil (50 wt %/50 wt %) was reacted for two hours. Catalyst removal was accomplished by THMP treatment. THMP treatments consisted of adding 1 M tris(hydroxymethyl)phosphine (THMP, 1.0 M, 50 mol THMP/mol C827) in water, stirring at ambient temperature for 2 hours, and then washing the product with water (2×100 mL) in a reparatory funnel. Olefin by-products and traces of residual water were removed from the product by the same procedure and distillation apparatus as described in Example 4 except that no nitrogen purge was used. The final pressure was about 0.2 torr absolute and the final liquid temperature was 195° C. The olefin content was less than 1% by mass and the $M_w$ of the glyceride oligomer was 16,700 g/mol. A sample of the final product was trans-esterified with methanol and analyzed by GC. See Table 7 (below).

Example 6—Cross-Metathesis of Soybean Oil with Butenylized Soybean Oil (BSO) on a Two-Kilogram Scale with Catalyst Removal and Olefin Stripping Using the same procedure and an apparatus similar to that described in Example 1 except that a 3 L flask was used in place of the 500 mL flask, a 1 kg, 50/50 wt % mixture of butenylized soybean oil and soybean oil (Costco) was reacted for about four hours using 100 ppm wt C827 catalyst after which time the $M_w$ was 11,700 g/mol. An additional 40 ppm of catalyst was added and after about two more hours the reaction was quenched with ethyl vinyl ether. The $M_w$ of the oligomer was 15,200 g/mol using THF as the mobile phase. Olefin by-products and traces of residual water were removed from a 265 g sample of the product by a similar distillation procedure and apparatus as described in Example 5. The final pressure was about 0.1 torr absolute and the final liquid temperature was 195° C. The olefin content was less than 1% by mass. A sample of the final product was trans-esterified with methanol and analyzed by GC. See Table 7 (below).

Example 7—Cross-Metathesis of Canola Oil with Butenylized Canola Oil (BCO) on a Twelve-Kilogram Scale with Catalyst Removal and Olefin Stripping This example was conducted in a 5 gallon Stainless Steel Reactor (Parr) equipped with an impeller, a port for air-free catalyst addition, and a Strahman valve for sampling. The reactor system was completely purged with nitrogen before beginning.

The BCO (6.16 kg) was produced by a procedure similar to that used in Example 1 and mixed with canola oil (6.12 kg) and charged to the reactor. The oil mixture was stirred at 200 rpm while purging with nitrogen gas for about 30 minutes through a dip tube at a rate of 0.5 SCFM. The reactor was evacuated to 200 torr (absolute) and heated to 70° C. The C827 metathesis catalyst (1.0 g, Materia, Inc., Pasadena, Calif., USA) was suspended in canola oil (50 mL) and added to the oil mixture. The reaction was maintained at 70° C. and at 200 torr for four hours at which time the $M_w$ of the glyceride oligomers was 16,600 g/mol. An additional charge of C827 catalyst (0.25 g) suspended in canola oil (50 mL) was added to the reaction. After an additional two hours, the $M_w$ was about 17,000 g/mol and the reactor was back filled with nitrogen.

Catalyst removal was conducted in a 5 gallon jacketed glass reactor equipped with an agitator, a bottom drain valve, and ports for adding reagents. A 0.12 M aqueous solution of THMP (0.31 kg) was charged to the glass reactor and pre-heated to about 90° C. The crude metathesis reaction product, still at 70° C., was transferred to the glass reactor and the mixture was stirred (150 rpm) at about 80-90° C. for 20 minutes. The following wash procedure was done twice. Deionized water (1.9 kg at 60° C.) was added to the reactor which was heated to 80-90° C. and the resulting mixture was stirred (100 rpm) for 20 minutes. The stirrer was stopped and the reactor contents were allowed to settle for 16 hours at a constant temperature of 80-90° C. The bottom aqueous layer was carefully drained off. Following the second wash, the washed product was cooled and then drained to a container.

The washed product was divided into two portions to remove olefins and residual water, which was done using a similar distillation procedure and apparatus as described in Example 5. The final distillation pressure was about 0.1 torr absolute and the final liquid temperature was about 190° C. Following distillation, the two portions were recombined to give a product with $M_w$ of 16,100 g/mol. A small sample of the recombined product was trans-esterified with methanol and analyzed by GC. See Table 7 (below)

Example 8—Diene-Selective Hydrogenation of Crude Glyceride Polymer

In a 600 mL Parr reactor, 170 g of crude metathesis product from Example 6, 170 g of n-decane (Sigma-Aldrich, anhydrous, >99%), and 0.60 g PRICAT 9908 (Johnson Matthey Catalysts); saturated triglyceride wax removed before reaction via a toluene wash) were purged with $N_2$, then $H_2$, for 15 minutes each, then reacted at 160° C. under 100 psig $H_2$ (Airgas, UHP) with 1000 rpm stirring with a gas dispersion impeller. The $H_2$ pressure was monitored and the reactor was refilled to 100 psig when it decreased to about 70 psig. After six hours, the reaction was cooled below 50° C. and the hydrogen was displaced by nitrogen gas. The reaction mixture was vacuum filtered through diatomaceous earth to remove the catalyst solids. Olefin by-products and n-decane were removed from the product by a similar distillation procedure and apparatus as described in Example 5. The final distillation pressure was about 0.1 torr absolute and the final liquid temperature was 195° C. The olefin content was less than 1% by mass. A sample of the final product was trans-esterified with methanol and analyzed by GC. The level of polyunsaturated C18 fatty acid methyl esters (C18:2 plus C18:3) were reduced from 3.88% in the starting material to 1.13% and the C21:2 diester was reduced from 6.40% in the starting material to 3.72%.

Gas Chromatographic Analysis of Fatty Acid Residues in Glyceride Copolymer

The final glyceride oligomer products described in Examples 4, 5, 6, and 7 were analyzed by gas chromatography after olefins were vacuum distilled to below 1% by weight and the resulting oligomer products were trans-esterified to methyl esters by the following procedure.

A sample 0.10±0.01 g was weighed into a 20 mL scintillation vial. A 1% solution of sodium methoxide in methanol (1.0 mL) was transferred by pipette into the vial and the vial was capped. The capped vial was placed in a sample shaker and shaken at 250 rpm and 60° C. until the sample was completely homogeneous and clear. The sample was removed from the shaker and 5 ml of brine solution followed by 5 ml of ethyl acetate were added by pipette. The vial was vortex mixed for one minute to thoroughly to mix the solution thoroughly. The mixed solution was allowed to sit until the two layers separated. The top (ethyl acetate) layer (1 mL) was transferred to a vial for gas chromatographic analysis. Their normalized compositions, based on a select group of components, are shown in Table 7 in units of wt %.

Gas chromatographic data were collected using an Agilent 6850 instrument equipped with an Agilent DB-WAXETR column (122-7332E, 30 m×250 um×0.25 um film thickness) and a Flame Ionization Detector. The methods and the conditions used are described as follows: The GC method "Fast_FAME.M" was used for the analyses of all samples in Examples 1 through 7 while method "PNG_FAME.M," with a longer run time and slightly higher final oven temperature, was used for obtaining the data in Example 8.

| Method FAST_FAME.M | Method PNG_FAME.M |
|---|---|
| OVEN | OVEN |
| Initial temp: 40° C. (On) | Initial temp: 40° C. (On) |
| Initial time: 0.00 min | Initial time: 0.00 min |
| Ramps: | Ramps: |
| # | Rate (° C./min) | Final temp (° C.) | Final time (min) | # | Rate (° C./min) | Final temp (° C.) | Final time (min) |
| 1 | 20.00 | 240 | 20.00 | 1 | 20.00 | 260 | 34.00 |
| 2 | 0 (Off) | | | 2 | 0 (Off) | | |
| Post temp: 0° C. | Post temp: 0° C. |
| Post time: 0.00 min | Post time: 0.00 min |
| Run time: 30.00 min | Run time: 45.00 min |
| Maximum temp: 260° C. | Maximum temp: 260° C. |
| Equilibration time: 0.10 min | Equilibration time: 0.10 min |

| Method FAST_FAME.M | Method PNG_FAME.M |
|---|---|
| INLET (SPLIT/SPLITLESS) | INLET (SPLIT/SPLITLESS) |
| Mode: Split | Mode: Split |
| Initial temp: 250° C. (On) | Initial temp: 250° C. (On) |
| Pressure: 6.06 psi (On) | Pressure: 6.06 psi (On) |
| Split ratio: 150:1 | Split ratio: 150:1 |
| Split flow: 149.9 mL/min | Split flow: 149.9 mL/min |
| Total flow: 157.5 mL/min | Total flow: 157.5 mL/min |
| Gas saver: On | Gas saver: On |
| Saver flow: 20.0 mL/min | Saver flow: 20.0 mL/min |
| Saver time: 2.00 min | Saver time: 2.00 min |
| Gas type: Hydrogen | Gas type: Hydrogen |
| DETECTOR (FID) | DETECTOR (FID) |
| Temperature: 300° C. (On) | Temperature: 300° C. (On) |
| Hydrogen flow: 40.0 mL/min (On) | Hydrogen flow: 40.0 mL/min (On) |
| Air flow: 450.0 mL/min (On) | Air flow: 450.0 mL/min (On) |
| Mode: Constant makeup flow | Mode: Constant makeup flow |
| Makeup flow: 30.0 mL/min (On) | Makeup flow: 30.0 mL/min (On) |
| Makeup Gas Type: Nitrogen | Makeup Gas Type: Nitrogen |
| Flame: On | Flame: On |
| Electrometer: On | Electrometer: On |
| Lit offset: 2.0 pA | Lit offset: 2.0 pA |
| COLUMN | COLUMN |
| Capillary Column | Capillary Column |
| Model Number: DB-WAXETR | Model Number: DB-WAXETR |
| Description: 122-7332E | Description: 122-7332E |
| Max temperature: 260° C. | Max temperature: 260° C. |
| Nominal length: 30.0 m | Nominal length: 30.0 m |
| Nominal diameter: 250.00 um | Nominal diameter: 250.00 um |
| Nominal film thickness: 0.25 um | Nominal film thickness: 0.25 um |
| Mode: constant flow | Mode: constant flow |
| Initial flow: 1.0 mL/min | Initial flow: 1.0 mL/min |
| Nominal init pressure: 6.06 psi | Nominal init pressure: 6.06 psi |
| Average velocity: 29 cm/sec | Average velocity: 29 cm/sec |
| Source: Inlet | Source: Inlet |
| Outlet: Detector | Outlet: Detector |
| Outlet pressure: ambient | Outlet pressure: ambient |
| SIGNAL | SIGNAL |
| Data rate: 20 Hz | Data rate: 20 Hz |
| Type: detector | Type: detector |
| Save Data: On | Save Data: On |
| INJECTOR | INJECTOR |
| Sample pre-washes: 3 | Sample pre-washes: 3 |
| Sample pumps: 1 | Sample pumps: 1 |
| Sample volume (uL): 1.000 | Sample volume (uL): 1.000 |
| Syringe size (uL): 10.0 | Syringe size (uL): 10.0 |
| Pre washes from bottle A: 3 | Pre washes from bottle A: 3 |
| Pre washes from bottle B: 3 | Pre washes from bottle B: 3 |
| Post washes from bottle A: 3 | Post washes from bottle A: 3 |
| Post washes from bottle B: 3 | Post washes from bottle B: 3 |
| Viscosity delay (seconds): 0 | Viscosity delay (seconds): 0 |
| Pre injection dwell (min): 0.00 | Pre injection dwell (min): 0.00 |
| Post injection dwell (min): 0.00 | Post injection dwell (min): 0.00 |
| Sample skim depth (mm): 0.0 (Off) | Sample skim depth (mm): 0.0 (Off) |
| NanoLiter Adapter Installed | NanoLiter Adapter Installed |
| Solvent Wash Mode: A, B | Solvent Wash Mode: A, B |
| Plunger Speed: Fast | Plunger Speed: Fast |
| Solvent saver: Off | Solvent saver: Off |

TABLE 7

| Fatty Acid Methyl Ester Component | Example 4 Product (wt %) | Example 5 Product (wt %) | Example 6 Product (wt %) | Example 7 Product (wt %) |
|---|---|---|---|---|
| C10:1 | — | 6.72 | 2.97 | 4.58 |
| C12:1 | 1.74 | 7.33 | 4.77 | 6.25 |
| C13:2 | — | 1.33 | 0.71 | 0.72 |
| C15:1 | 8.53 | 5.05 | 12.21 | 5.05 |
| C16:0 | 5.89 | 6.12 | 14.69 | 5.65 |
| C16:1 | 1.97 | 1.08 | 0.43 | 1.06 |
| C18:0 | 2.53 | 2.65 | 6.05 | 2.58 |
| C18:1 | 35.87 | 19.52 | 6.31 | 19.80 |
| C18:2 | 0.80 | 1.33 | 3.46 | 0.89 |
| C18:3 | 0.64 | 0.39 | 0.42 | 0.27 |
| C20:0 | 1.30 | 0.85 | 0.48 | 0.90 |

TABLE 7-continued

| Fatty Acid Methyl Ester Component | Example 4 Product (wt %) | Example 5 Product (wt %) | Example 6 Product (wt %) | Example 7 Product (wt %) |
|---|---|---|---|---|
| C20:1 | 2.10 | 1.08 | 0.29 | 1.15 |
| C21:2 | 2.82 | 3.59 | 1.76 | 3.61 |
| C22:0 | 0.53 | 0.56 | 0.08 | 0.60 |
| C18:1 diester | 26.80 | 29.10 | 21.84 | 29.85 |
| C20:1 diester | 3.09 | 3.11 | 1.02 | 3.08 |
| C21:2 diester | 1.00 | 5.10 | 6.40 | 4.95 |

What is claimed is:

1. A method of forming a glyceride copolymer, the method comprising:
   (a) providing a reaction mixture comprising a first metathesis catalyst, unsaturated natural oil glycerides, and unsaturated alkenylized natural oil glycerides, wherein the number ratio of constitutional units formed from the unsaturated natural oil glycerides to constitutional units formed from the unsaturated alkenylized natural oil glycerides is no more than 10:1; and
   (b) reacting the unsaturated natural oil glycerides and unsaturated alkenylized natural oil glycerides in the presence of the first metathesis catalyst to form the glyceride copolymer.

2. The method of claim 1, wherein the unsaturated alkenylized natural oil glycerides are formed from the reaction of unsaturated natural oil glycerides with a short-chain alkene in the presence of a second metathesis catalyst.

3. The method of claim 2, wherein the short-chain alkene is selected from the group consisting of ethylene, propylene, 1-butene, 2-butene, isobutene, 1-pentene, 2-pentene, 1-hexene, 2-hexene, and 3-hexene.

4. The method of claim 3, wherein the short-chain alkene is selected from the group consisting of ethylene, propylene, 1-butene, 2-butene, and isobutene.

5. The method of claim 4, wherein the short-chain alkene is ethylene.

6. The method of claim 4, wherein the short-chain alkene is propylene.

7. The method of claim 4, wherein the short-chain alkene is 1-butene.

8. The method of claim 4, wherein the short-chain alkene is 2-butene.

9. The method of claim 1, wherein the unsaturated natural oil glycerides are obtained from a natural oil.

10. The method of claim 9, wherein the unsaturated natural oil glycerides are obtained from a vegetable oil.

11. The method of claim 10, wherein the vegetable oil is selected from the group consisting of rapeseed oil, canola oil (low erucic acid rapeseed oil), coconut oil, corn oil, cottonseed oil, olive oil, palm oil, peanut oil, safflower oil, sesame oil, soybean oil, sunflower oil, linseed oil, palm kernel oil, tung oil, jatropha oil, mustard seed oil, pennycress oil, camelina oil, hempseed oil, and castor oil.

12. The method of claim 1, wherein the glyceride copolymer has a number average molecular weight ranging from 4,000 g/mol to 150,000 g/mol.

13. The method of claim 1, wherein the first metathesis catalyst is selected from the group consisting of an organoruthenium compound, an organoosmium compound, an organotungsten compound, and an organomolybdenum compound.

14. The method of claim 1, wherein the second metathesis catalyst is selected from the group consisting of an organoruthenium compound, an organoosmium compound, an organotungsten compound, and an organomolybdenum compound.

* * * * *